US008873908B2

(12) United States Patent
Hu et al.

(10) Patent No.: US 8,873,908 B2
(45) Date of Patent: Oct. 28, 2014

(54) OPTICAL-FIBER ARRAY AND METHOD

(71) Applicant: Lockheed Martin Corporation, Bethesda, MD (US)

(72) Inventors: Yongdan Hu, Bothell, WA (US); Charles A. Lemaire, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/960,570

(22) Filed: Aug. 6, 2013

(65) Prior Publication Data

US 2014/0205230 A1 Jul. 24, 2014

Related U.S. Application Data

(62) Division of application No. 12/861,773, filed on Aug. 23, 2010, now Pat. No. 8,503,840.

(51) Int. Cl.
*G02B 6/32* (2006.01)
*G02B 6/27* (2006.01)
*G02B 6/28* (2006.01)

(52) U.S. Cl.
CPC ............ *G02B 6/2726* (2013.01); *G02B 6/2843* (2013.01); *G02B 6/2773* (2013.01); *G02B 6/272* (2013.01)
USPC .............................................. 385/33; 385/27

(58) Field of Classification Search
CPC .. G02B 6/2773; G02B 6/2843; G02B 6/2848; G02B 6/272; G02B 6/024
USPC ..................................................... 385/33–35
See application file for complete search history.

(56) References Cited

U.S. PATENT DOCUMENTS

| 6,771,426 | B2 * | 8/2004 | Yamamoto et al. | 359/641 |
|---|---|---|---|---|
| 6,847,491 | B1 * | 1/2005 | Jian et al. | 359/642 |
| 6,954,575 | B2 * | 10/2005 | Fermann et al. | 385/128 |
| 7,236,665 | B2 * | 6/2007 | Kobayashi et al. | 385/33 |
| 7,483,601 | B2 * | 1/2009 | Ma | 385/16 |
| 8,503,840 | B2 * | 8/2013 | Hu et al. | 385/33 |
| 2002/0021868 | A1 * | 2/2002 | Mandella | 385/34 |
| 2002/0076151 | A1 * | 6/2002 | Kinard et al. | 385/33 |
| 2002/0110323 | A1 * | 8/2002 | Kishima | 385/33 |
| 2002/0131699 | A1 * | 9/2002 | Raguin et al. | 385/33 |
| 2002/0131703 | A1 * | 9/2002 | Velikov | 385/35 |
| 2002/0172486 | A1 * | 11/2002 | Fermann | 385/128 |

(Continued)

*Primary Examiner* — Rhonda Peace
(74) *Attorney, Agent, or Firm* — Jonathan M. Rixen; Charles A. Lemaire; Lemaire Patent Law Firm, P.L.L.C.

(57) ABSTRACT

Method and apparatus for forming an optical-fiber-array assembly, which include providing a plurality of optical fibers including a first optical fiber and a second optical fiber, providing a fiber-array plate that includes a first surface and a second surface, connecting the plurality of optical fibers to the first surface of the fiber-array plate, transmitting a plurality of optical signals through the optical fibers into the fiber-array plate at the first surface of the fiber-array plate, and emitting from the second surface of the fiber-array plate a composite output beam having light from the plurality of optical signals. Optionally, the first surface of the fiber-array plate includes indicia configured to assist in the alignment of the plurality of optical fibers on the first surface of the fiber-array plate. In some embodiments, the second surface of the fiber-array plate includes a plurality of beam-shaping optics configured to shape the composite output beam.

21 Claims, 26 Drawing Sheets

(56) References Cited

U.S. PATENT DOCUMENTS

| | | | |
|---|---|---|---|
| 2004/0067015 A1* | 4/2004 | Nakajima | 385/33 |
| 2004/0165822 A1* | 8/2004 | Kobayashi et al. | 385/33 |
| 2004/0170353 A1* | 9/2004 | Kobayashi et al. | 385/33 |
| 2005/0232313 A1* | 10/2005 | Fermann et al. | 372/6 |
| 2007/0071387 A1* | 3/2007 | Weng | 385/33 |
| 2008/0106778 A1* | 5/2008 | Ma | 359/223 |
| 2012/0045169 A1* | 2/2012 | Hu et al. | 385/33 |

\* cited by examiner

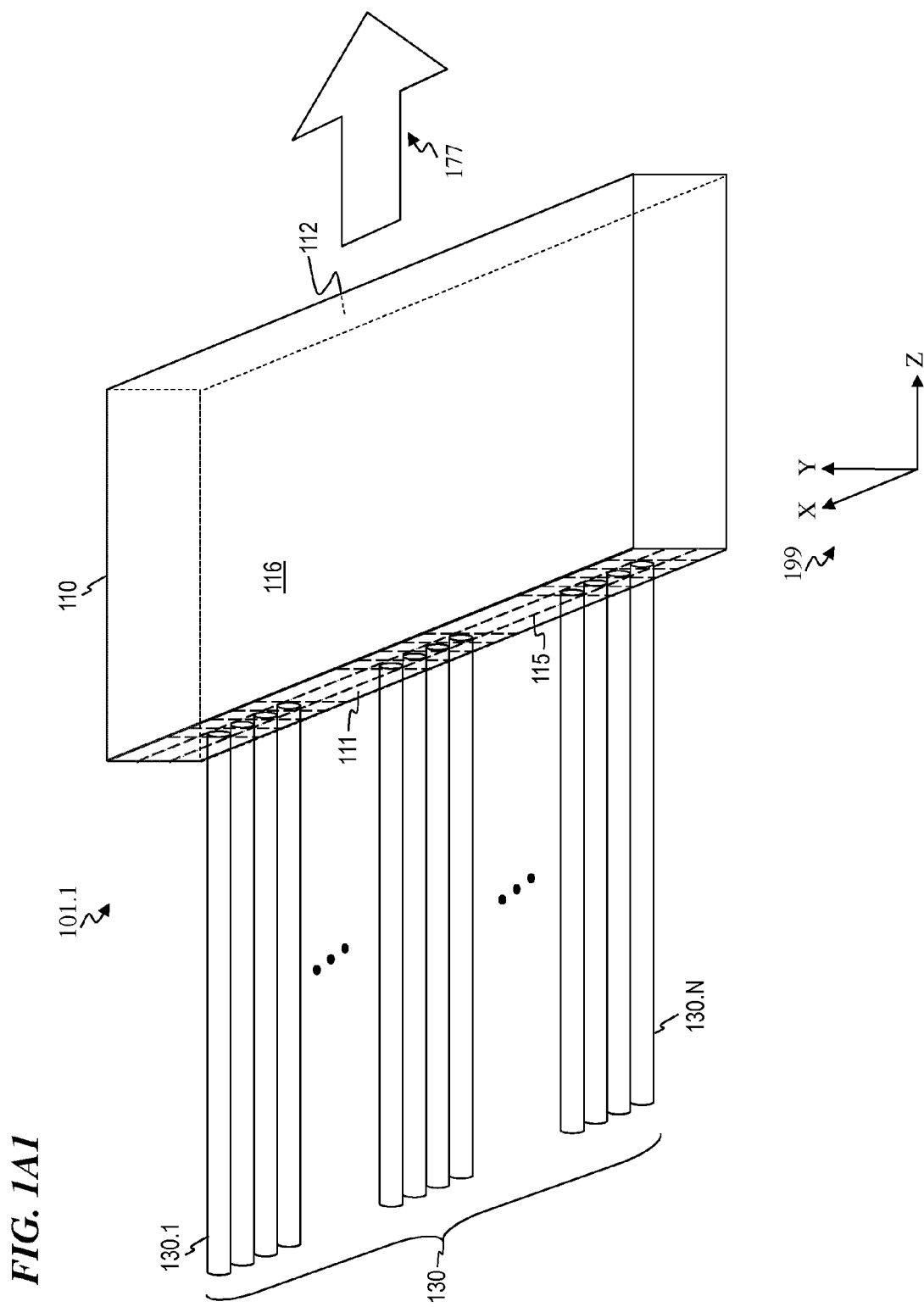
FIG. 1A1

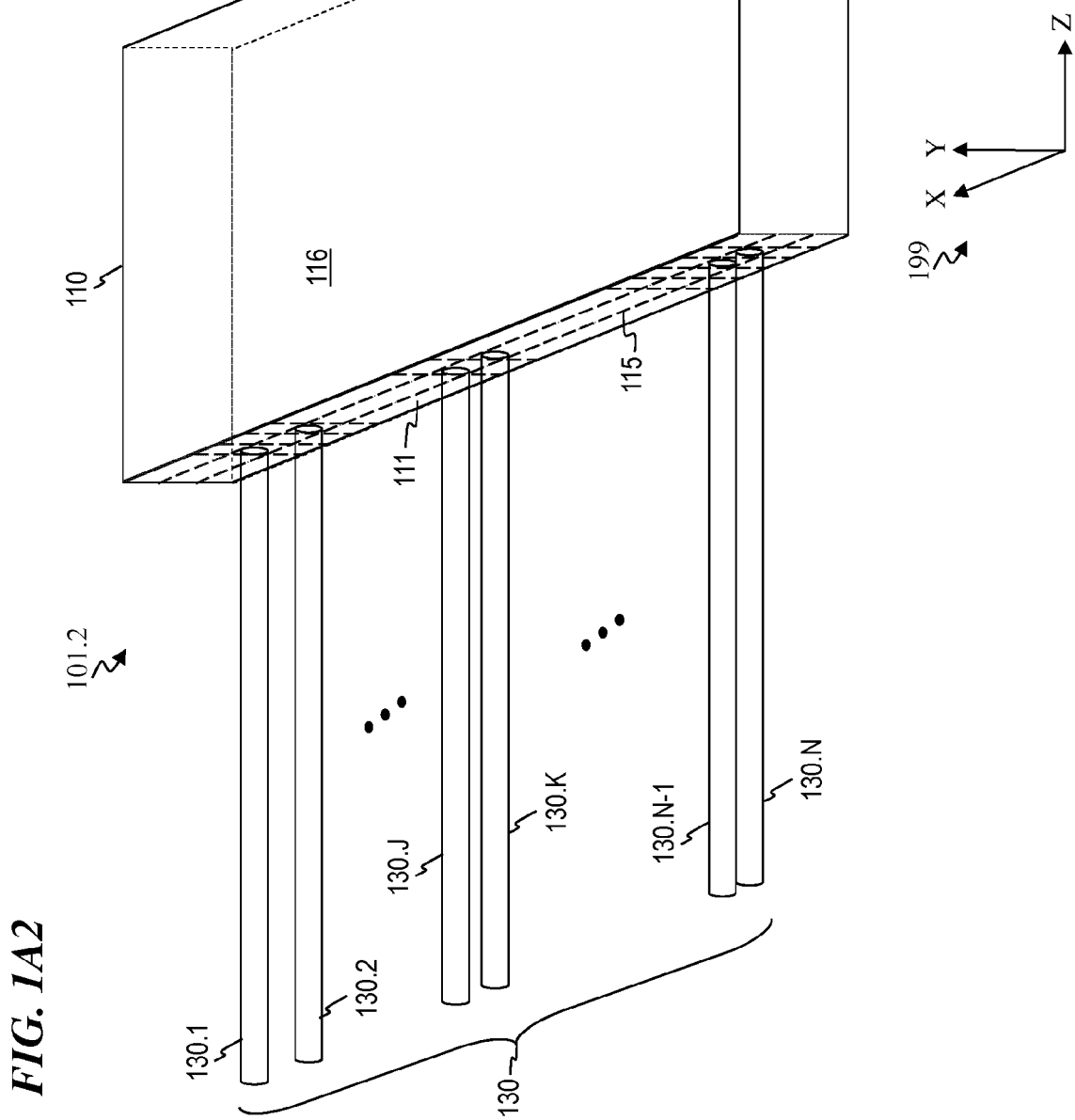

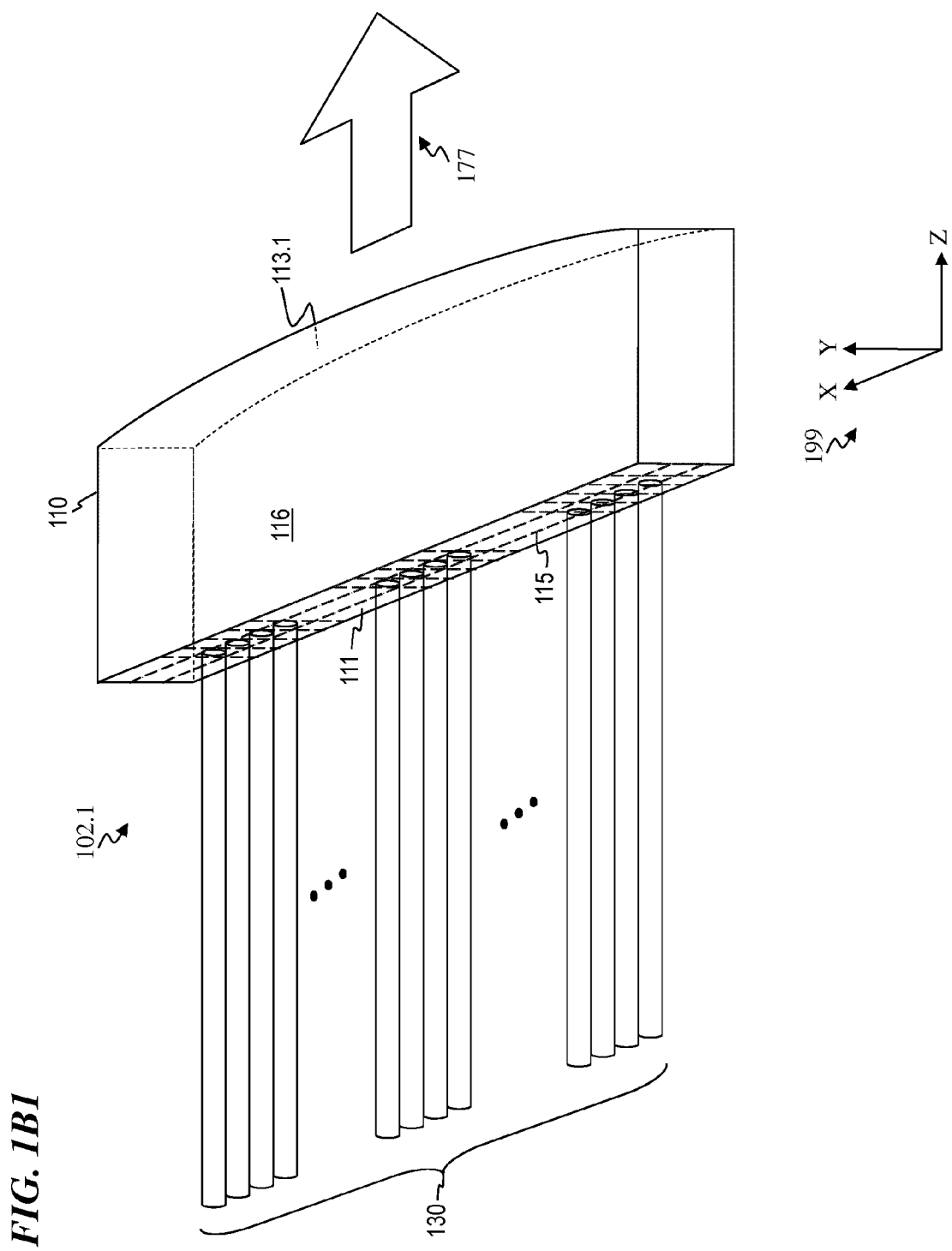
FIG. 1B1

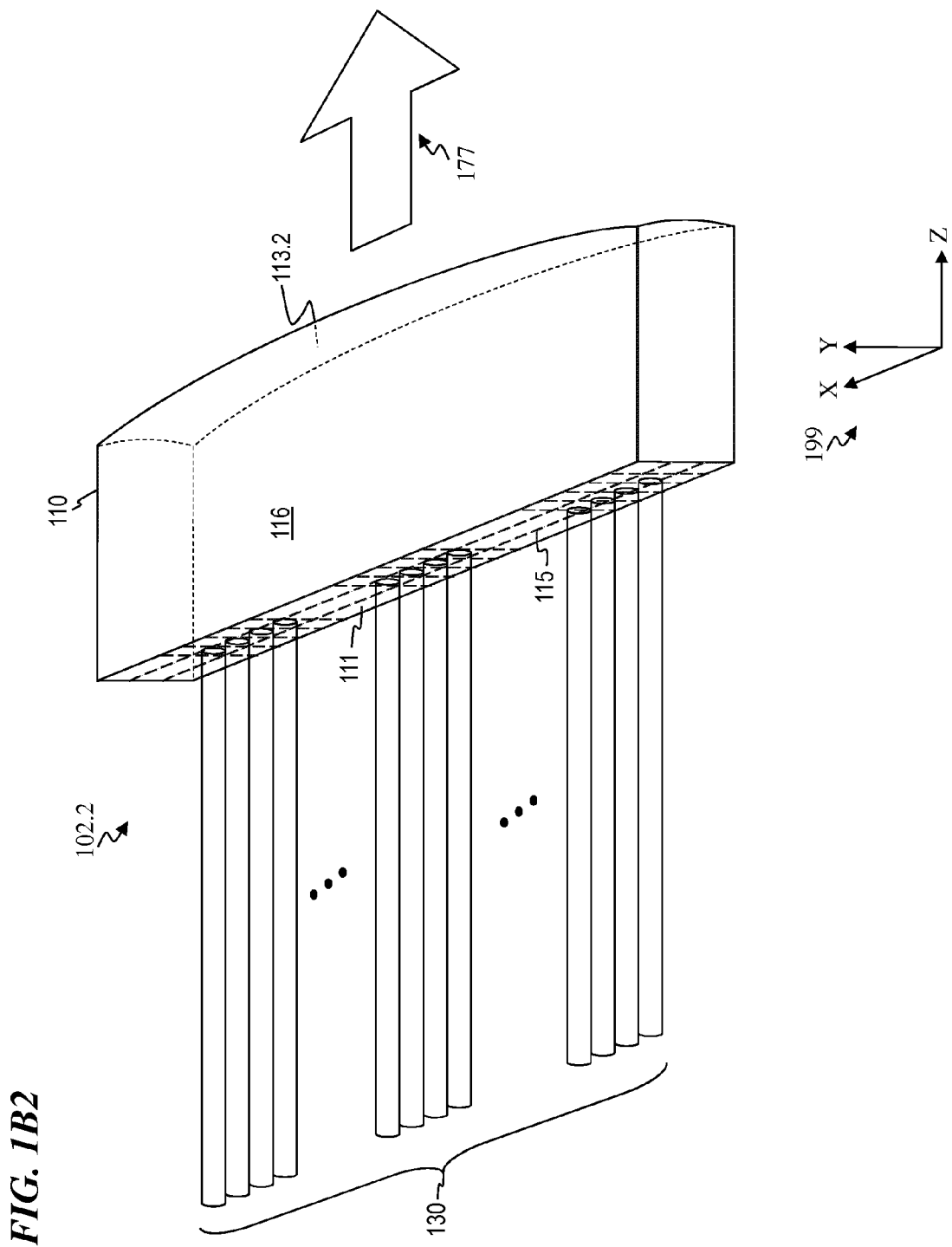
FIG. 1B2

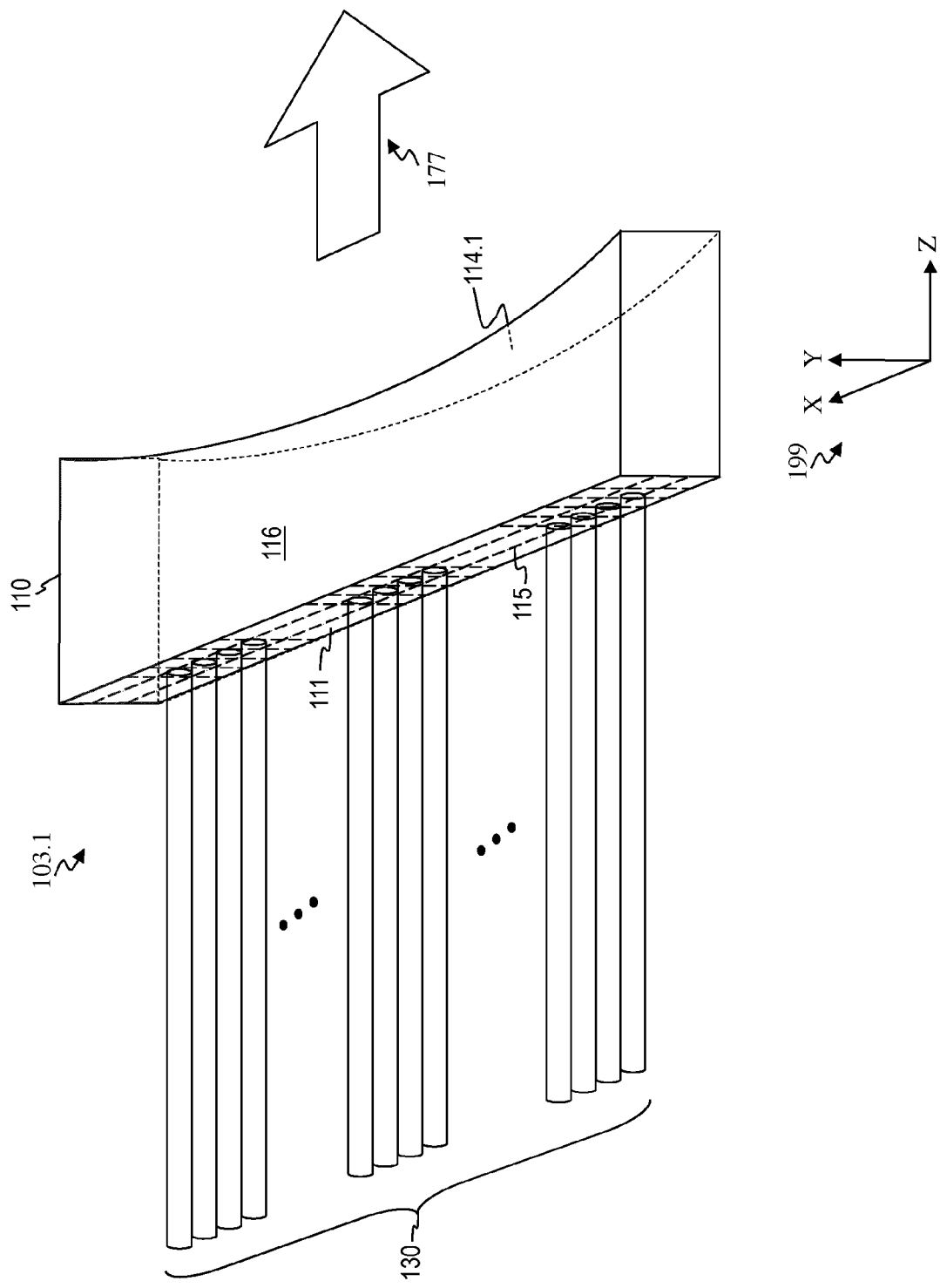
FIG. 1C1

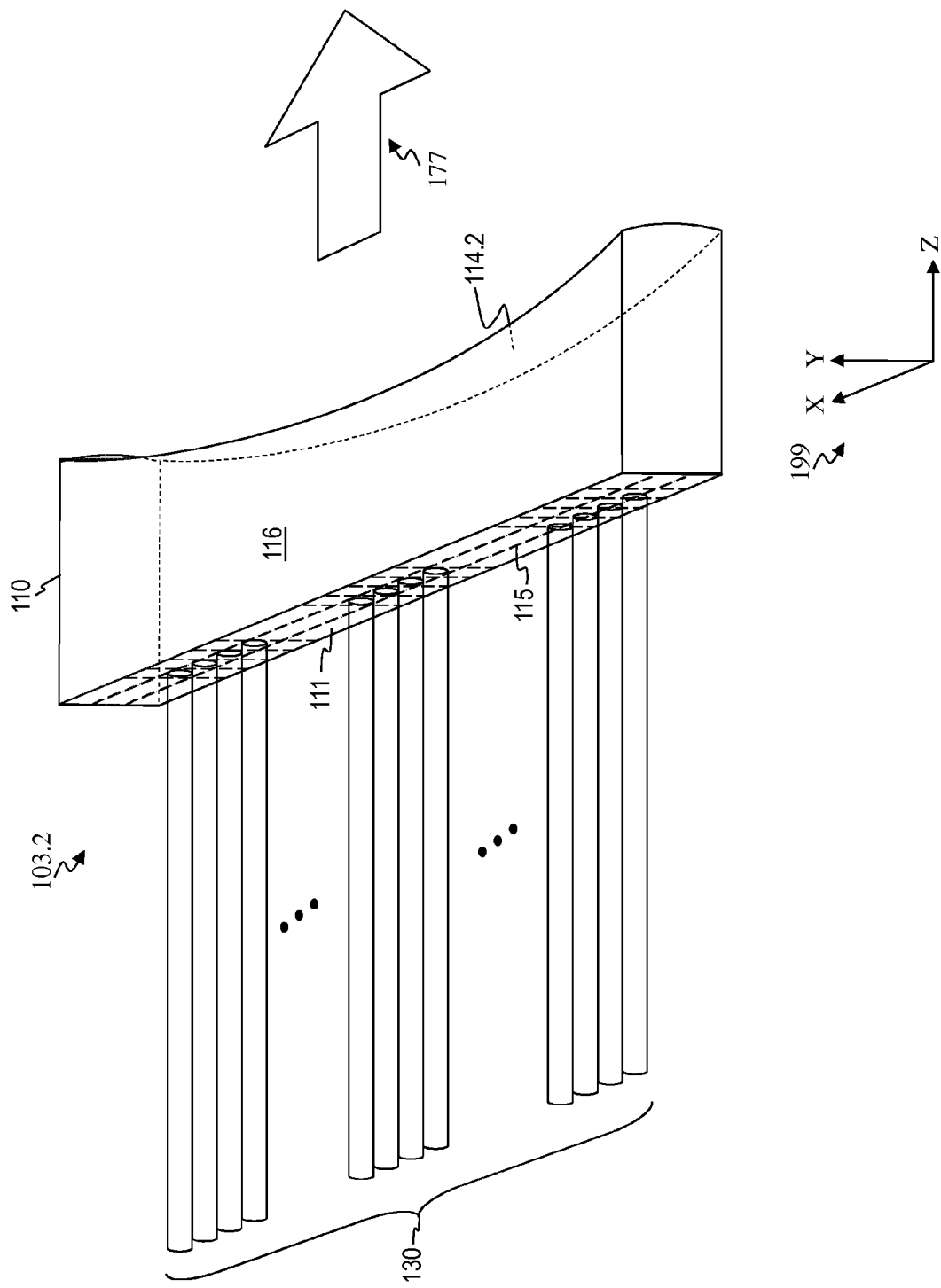
FIG. 1C2

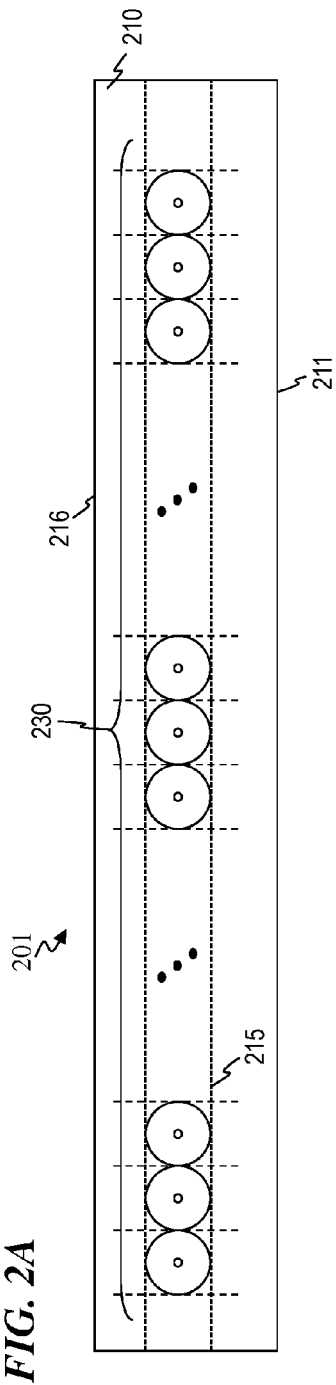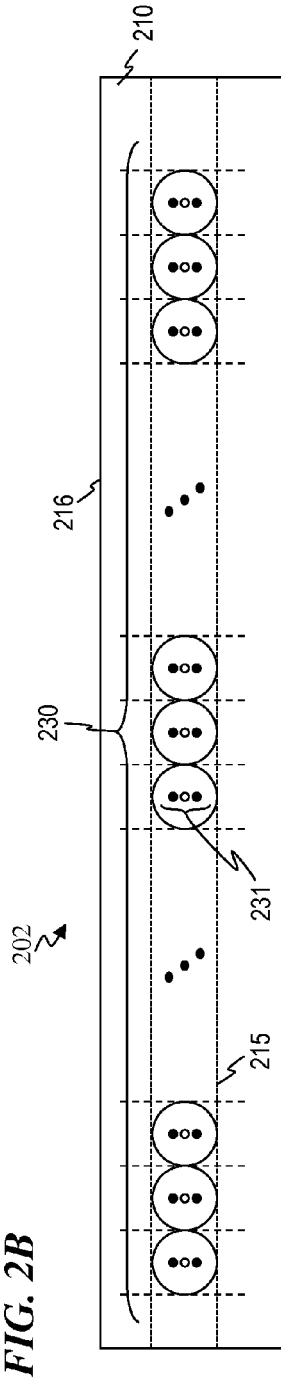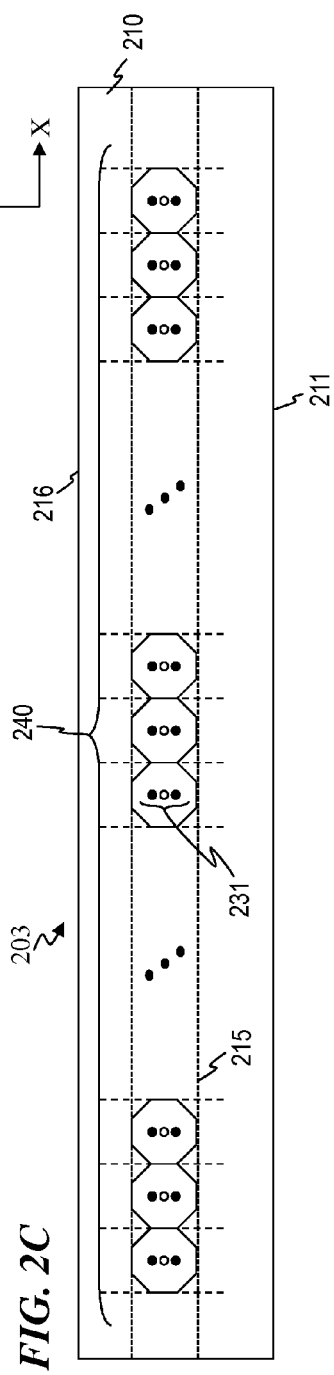

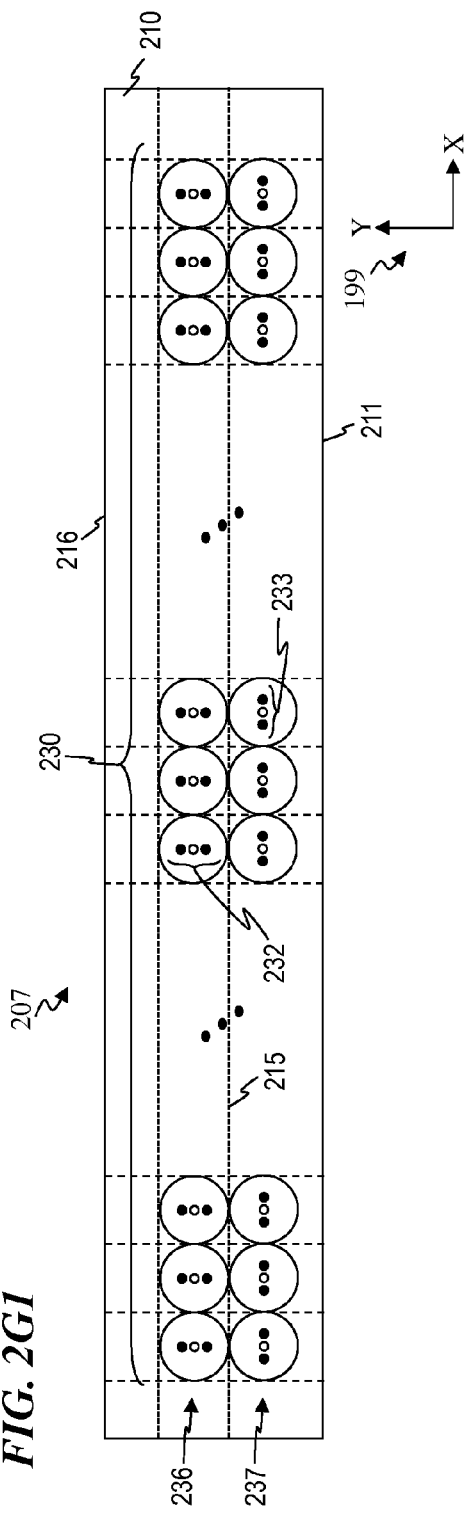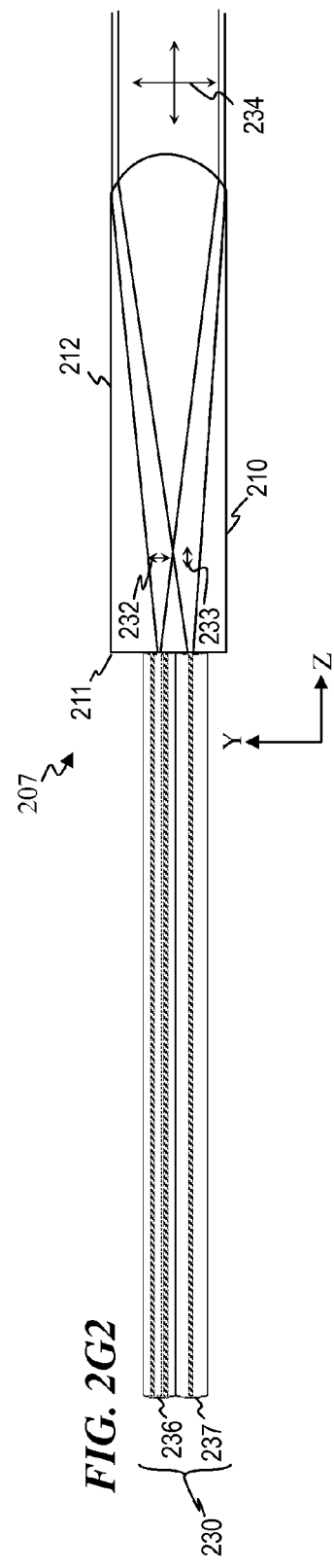

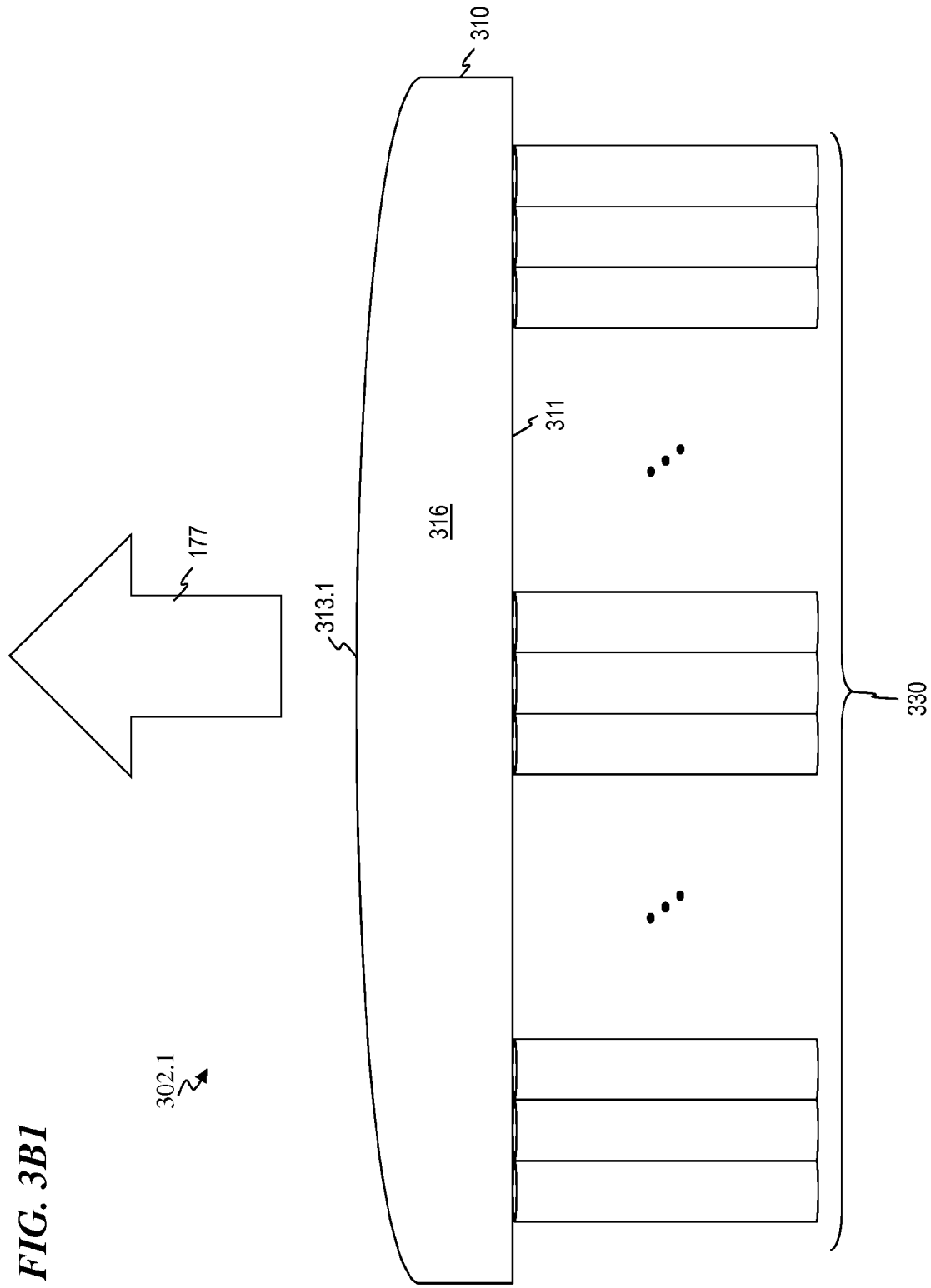
FIG. 3B1

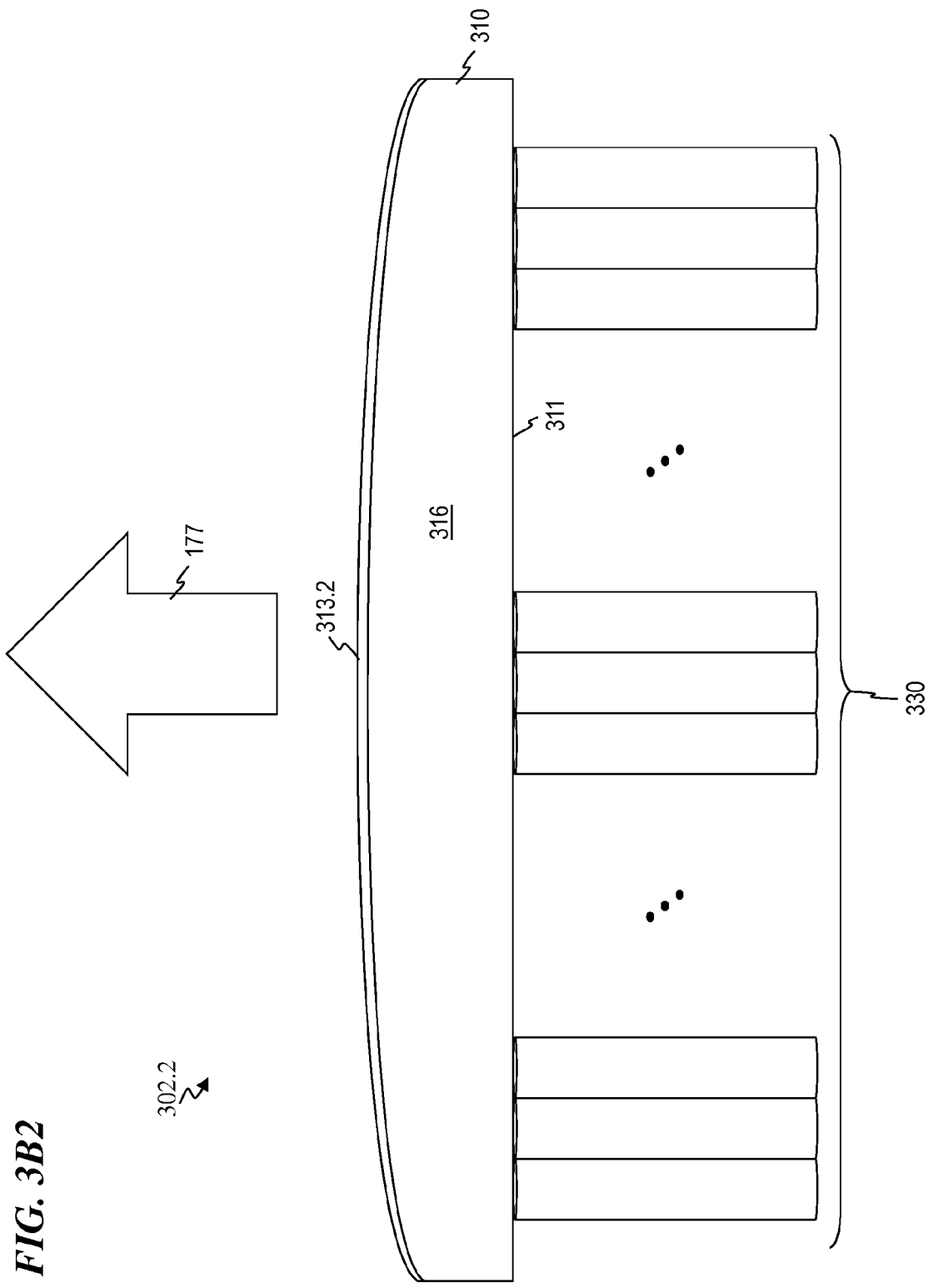

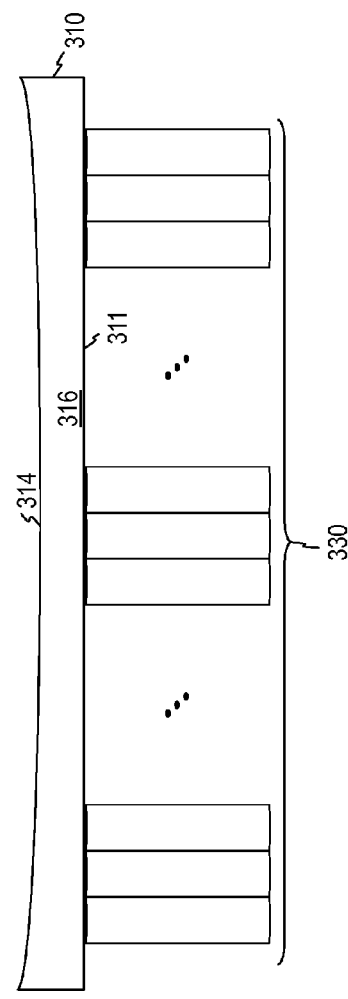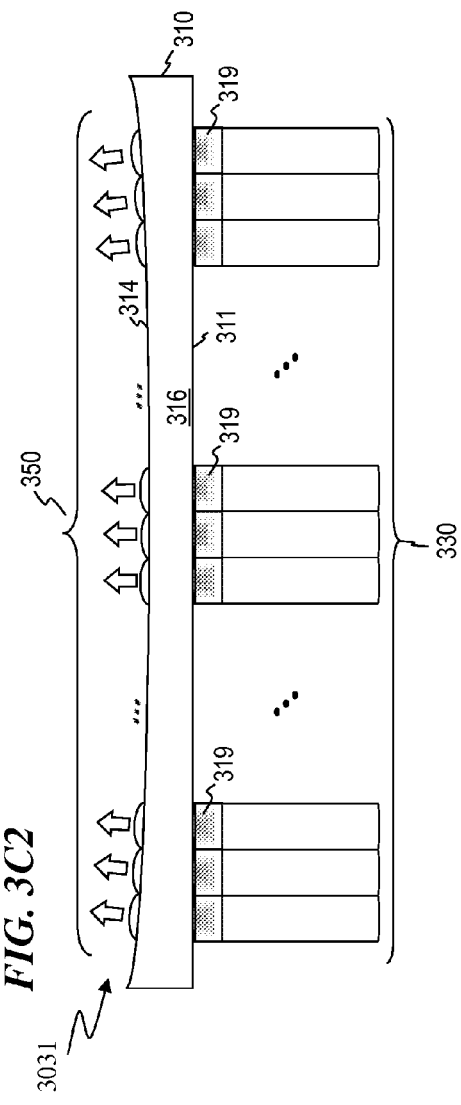

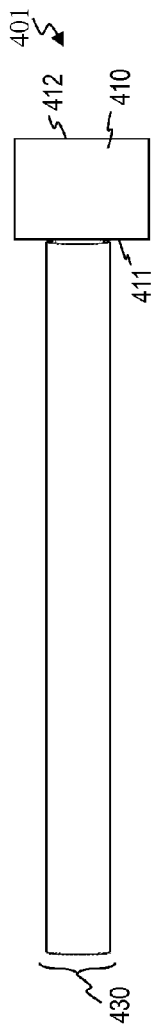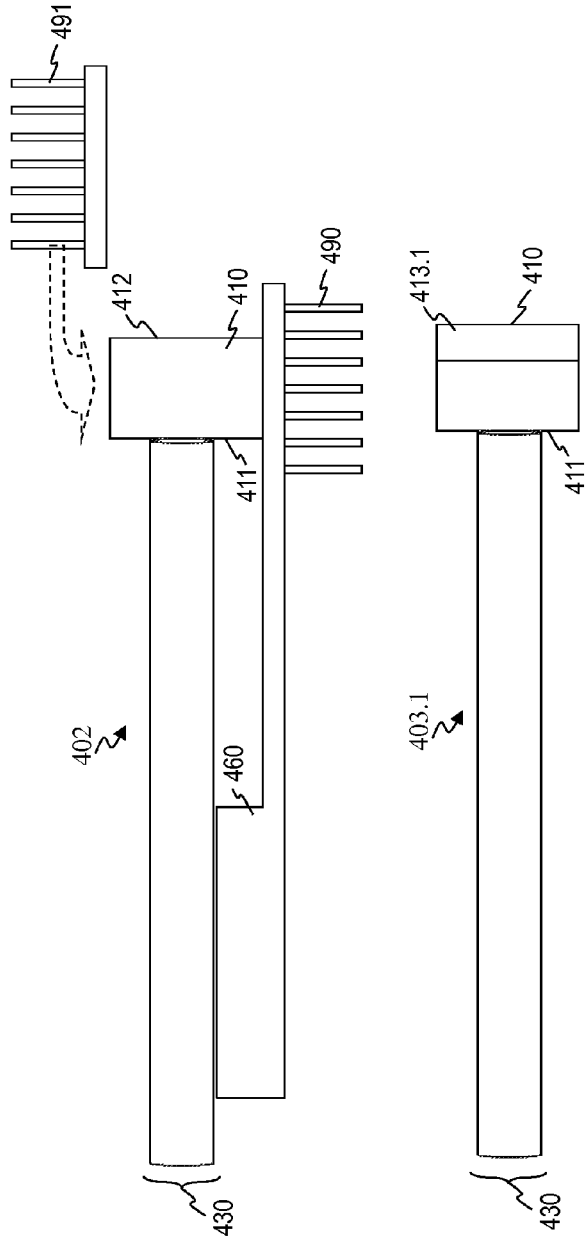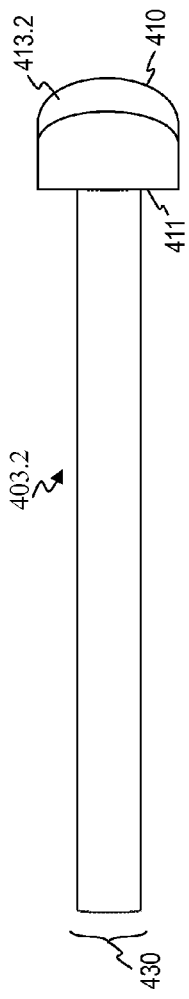
FIG. 4A   FIG. 4B   FIG. 4C1   FIG. 4C2

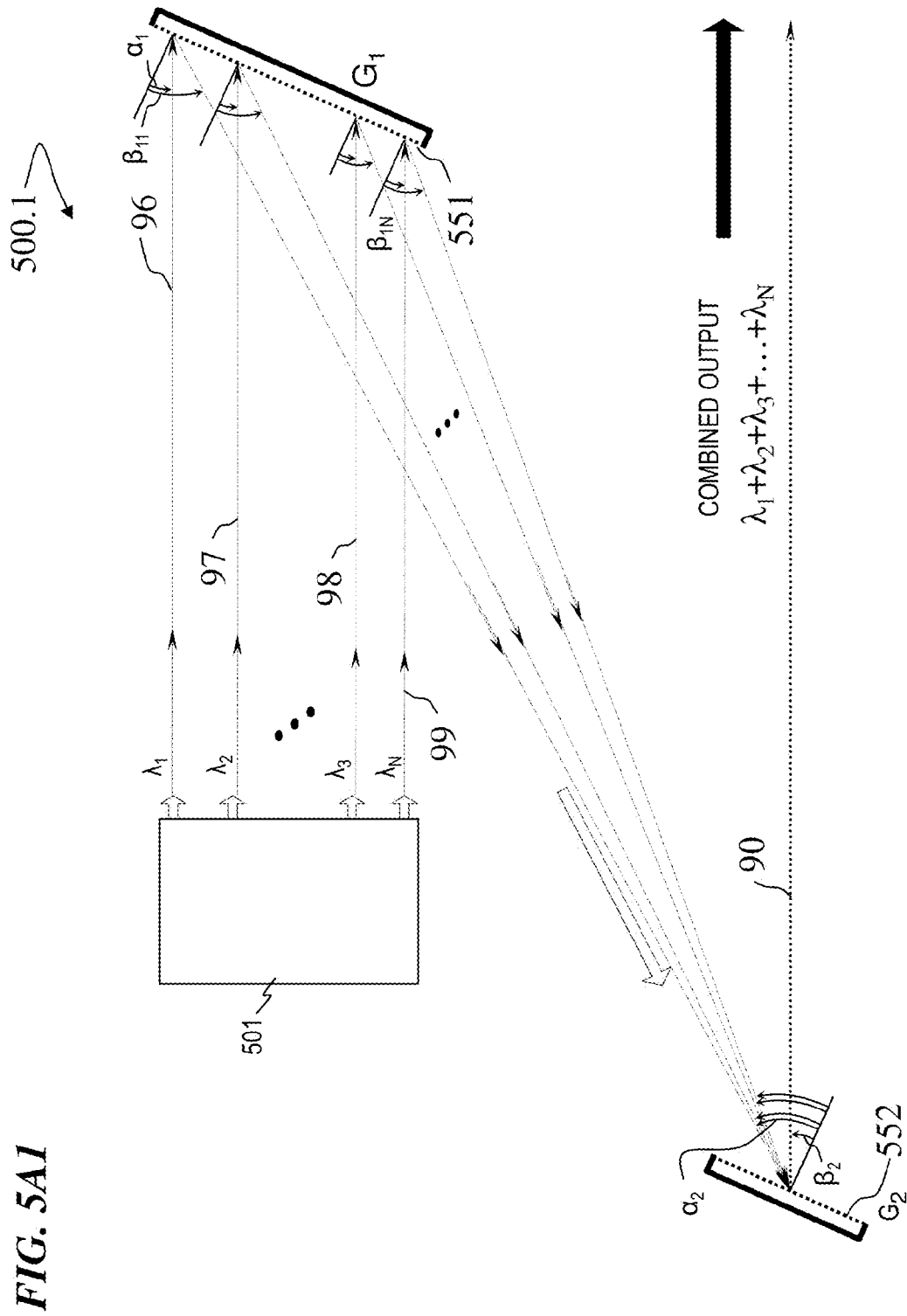
FIG. 5A1

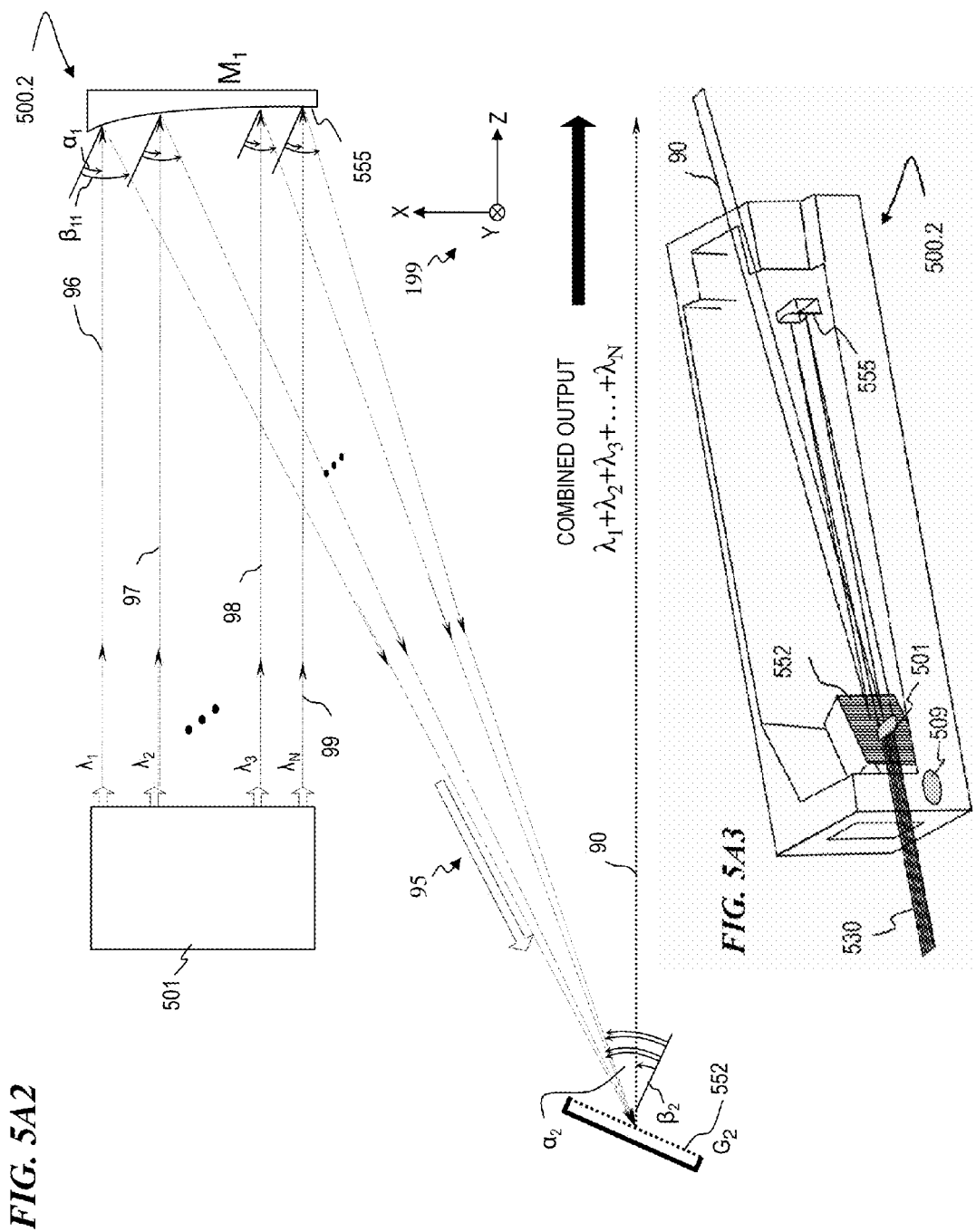

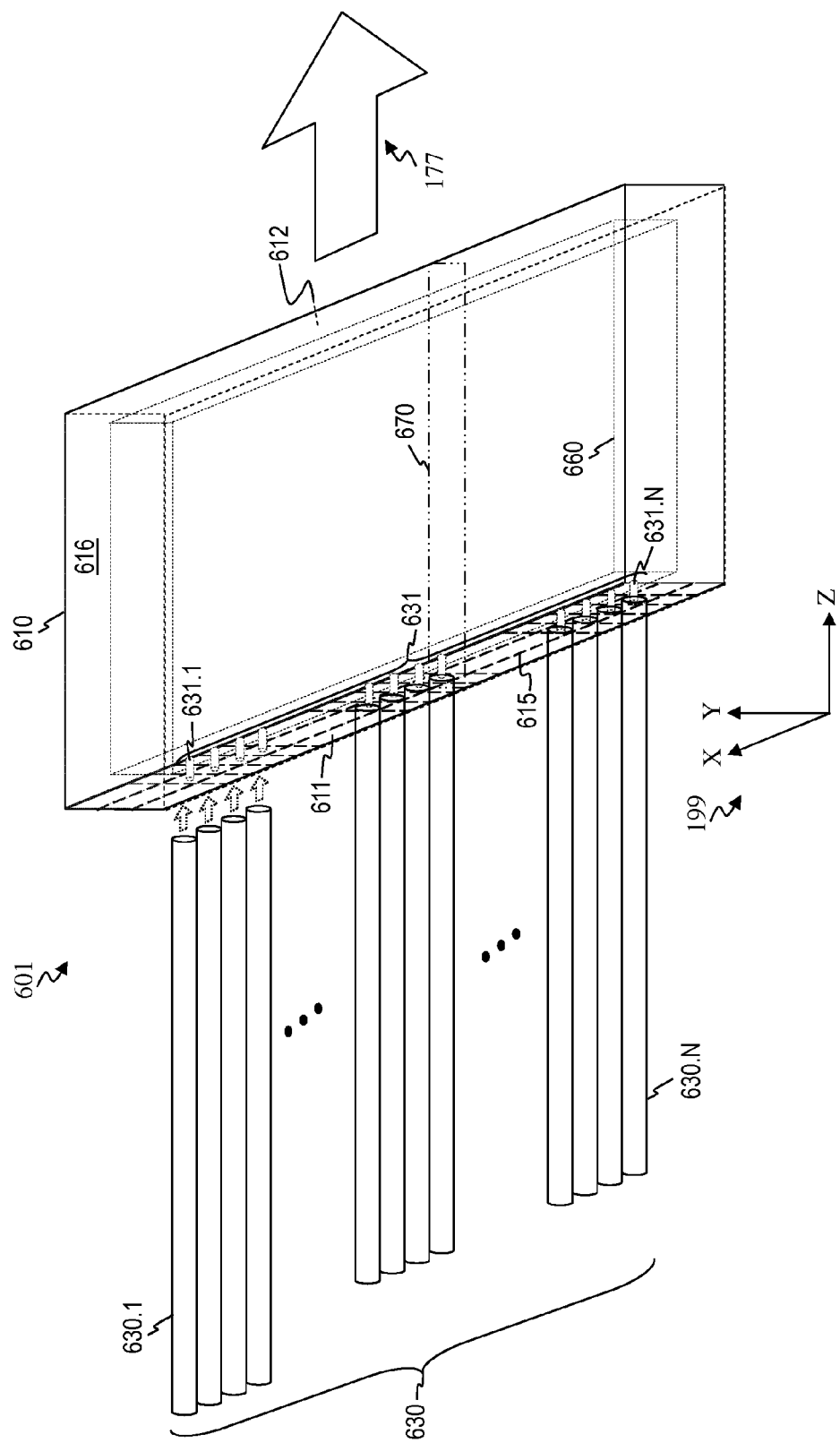
FIG. 6A1

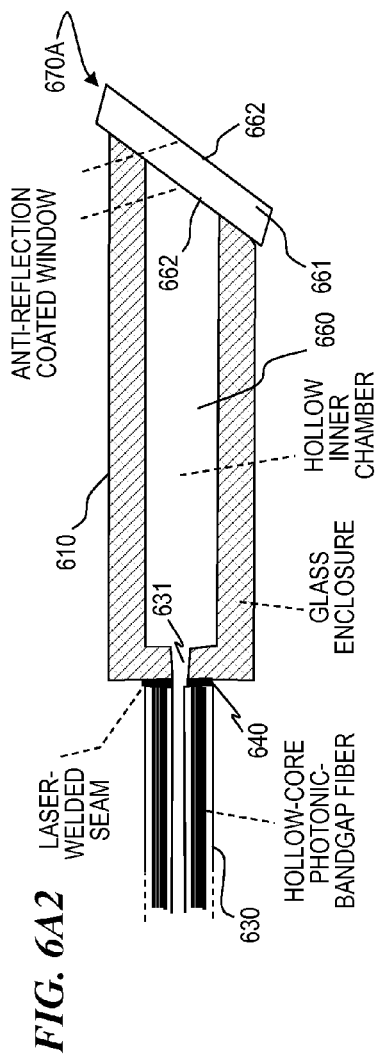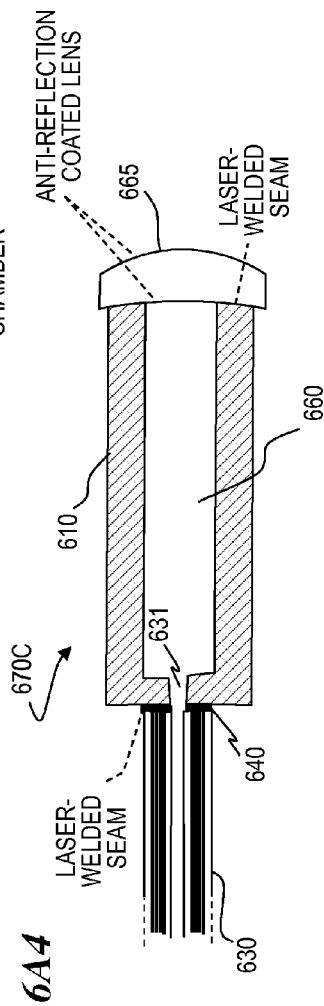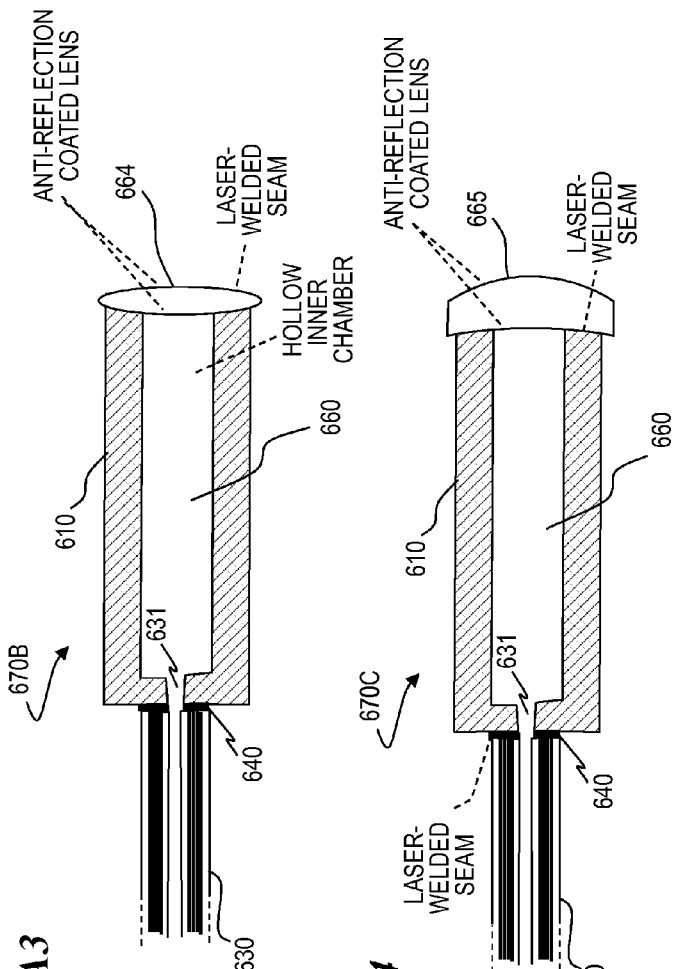
FIG. 6A2
FIG. 6A3
FIG. 6A4

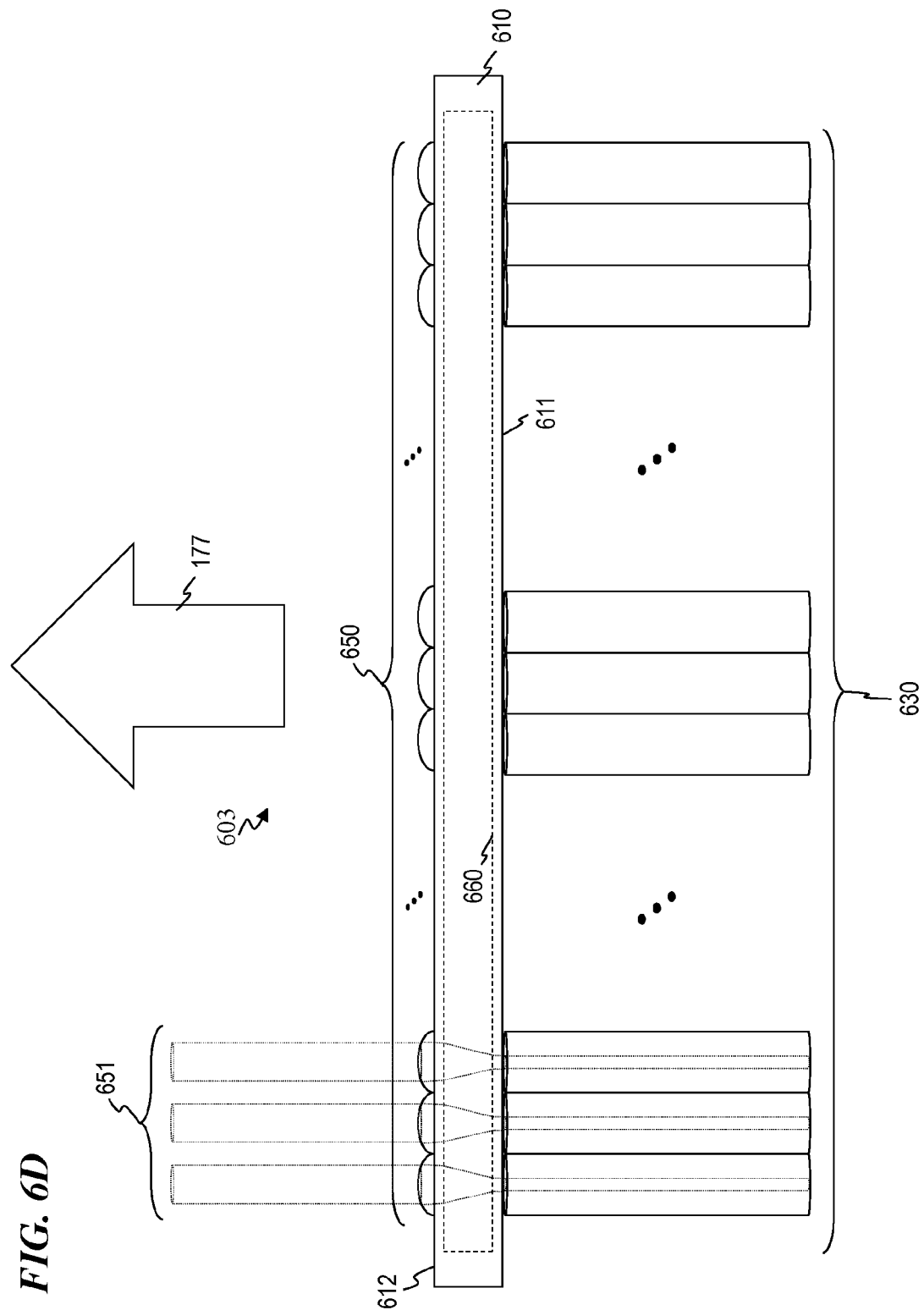

OPTICAL-FIBER ARRAY AND METHOD

CROSS-REFERENCE TO RELATED APPLICATIONS

This is a divisional of and claims benefit of U.S. patent application Ser. No. 12/861,773 filed on Aug. 23, 2010, titled "OPTICAL-FIBER ARRAY METHOD AND APPARATUS" (which issued as U.S. Pat. No. 8,503,840 on Aug. 6, 2013), which is incorporated herein by reference in its entirety.

This invention is related to:
- U.S. Pat. No. 7,539,231 titled "APPARATUS AND METHOD FOR GENERATING CONTROLLED-LINEWIDTH LASER-SEED-SIGNALS FOR HIGH-POWERED FIBER-LASER AMPLIFIER SYSTEMS" that issued May 26, 2009 to Eric C. Honea et al.,
- U.S. Pat. No. 7,471,705 titled "ULTRAVIOLET LASER SYSTEM AND METHOD HAVING WAVELENGTH IN THE 200-NM RANGE" that issued Dec. 30, 2008 to David C. Gerstenberger et al.,
- U.S. Pat. No. 7,391,561 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" that issued Jun. 24, 2008 to Fabio Di Teodoro et al.,
- U.S. Pat. No. 7,671,337 titled "SYSTEM AND METHOD FOR POINTING A LASER BEAM" that issued Mar. 2, 2010 to Steven C. Tidwell,
- U.S. Pat. No. 7,199,924 titled "APPARATUS AND METHOD FOR SPECTRAL-BEAM COMBINING OF HIGH-POWER FIBER LASERS," which issued on Apr. 3, 2007 to Andrew J. W. Brown et al.,
- U.S. patent application Ser. No. 11/565,619 titled "METHOD AND APPARATUS FOR OPTICAL GAIN FIBER HAVING SEGMENTS OF DIFFERING CORE SIZES" filed on Nov. 30, 2006 by Matthias P. Savage-Leuchs (which issued as U.S. Pat. No. 7,768,700 on Aug. 3, 2010),
- U.S. patent application Ser. No. 11/688,854 filed Mar. 20, 2007 by John D. Minelly et al., titled "METHOD AND APPARATUS FOR OPTICAL DELIVERY FIBER HAVING CLADDING WITH ABSORBING REGIONS" (which issued as U.S. Pat. No. 7,865,608 on Nov. 16, 2010);
- U.S. patent application Ser. No. 12/018,193 titled "HIGH-ENERGY EYE-SAFE PULSED FIBER AMPLIFIERS AND SOURCES OPERATING IN ERBIUM'S L-BAND" filed Jan. 22, 2008 by John D. Minelly et al. (which issued as U.S. Pat. No. 7,872,794 on Jan. 18, 2011),
- U.S. patent application Ser. No. 12/291,031 titled "SPECTRAL-BEAM COMBINING FOR HIGH-POWER FIBER-RING-LASER SYSTEMS" filed Feb. 17, 2009 by Eric C. Honea et al. (which issued as U.S. Pat. No. 8,526,110 on Sep. 3, 2013),
- U.S. patent application Ser. No. 12/624,327 titled "SPECTRALLY BEAM COMBINED LASER SYSTEM AND METHOD AT EYE-SAFER WAVELENGTHS" filed Nov. 23, 2009 by Roy D. Mead (which issued as U.S. Pat. No. 8,441,718 on May 14, 2013),
- U.S. patent application Ser. No. 12/793,508 titled "METHOD AND APPARATUS FOR IN-LINE FIBER-CLADDING-LIGHT DISSIPATION" filed Jun. 3, 2010 by Yongdan Hu (which issued as U.S. Pat. No. 8,355,608 on Jan. 15, 2013),
- U.S. Provisional Patent Application 61/263,736 filed Nov. 23, 2009 by Matthias P. Savage-Leuchs et al., titled "Q-switched oscillator seed-source for MOPA laser illuminator method and apparatus,"
- U.S. Provisional Patent Application 61/343,948 filed on Apr. 12, 2010, titled "High Beam Quality and High Average Power from Large-Core-Size Optical-Fiber Amplifiers; Signal and Pump Mode-Field Adaptor for Double-Clad Fibers and Associated Method" by Matthias Savage-Leuchs et al., and
- U.S. Provisional Patent Application 61/343,945 filed on Apr. 12, 2010, titled "Apparatus for Optical Fiber Management and Cooling" by Yongdan Hu et al., which are all hereby incorporated herein by reference.

FIELD OF THE INVENTION

The invention relates generally to optical waveguides, and more particularly to methods and apparatus for mechanically and optically coupling optical-fiber arrays to fabricate a unified structure that forms a composite output light beam from the light of a plurality of optical waveguides such as optical fibers.

BACKGROUND OF THE INVENTION

Existing optical-fiber arrays are generally difficult to manufacture because of the required alignment precision between fibers. Many conventional fiber-array systems, like V-groove-based substrates that hold an array of fibers, also have limited power-handling capability. In addition, for applications such as spectral-beam combining, existing optical-fiber arrays present excessive optical aberrations from their extended source of light.

U.S. Pat. No. 7,058,275 (hereinafter, "Sezerman et al."), titled "STRESS RELIEF IN FIBRE OPTIC ARRAYS", issued Jun. 6, 2006, and is incorporated herein by reference. Sezerman et al. describe a mechanism for achieving symmetrical stress loads on operating optical fibers held in fiber-optic arrays that includes, in one embodiment, the provision of a pair of non-operating or dummy fibers, each located outboard of the outermost or curb fibers of the array. All of the fibers, whether operating or dummy, are held in corresponding grooves in a substrate.

U.S. Pat. No. 6,402,390 (hereinafter, "Anderson et al."), titled "V-GROOVE ADAPTERS FOR INTERCONNECTING OPTICAL CONDUCTORS", issued Jun. 11, 2002, and is incorporated herein by reference. Anderson et al. describe a V-groove adapter for interconnecting optical conductors that includes V-grooves that are precisely aligned with respect to one another to provide a desired alignment of the respective cores of the optical conductors received within the respective V-grooves.

U.S. Pat. No. 7,738,751 (hereinafter, "Minden et al."), titled "ALL-FIBER LASER COUPLER WITH HIGH STABILITY", issued Jun. 15, 2010, and is incorporated herein by reference. Minden et al. describe a plurality of optical fibers arranged in a close-packed hexagonal array having $1+3n(n+1)$ fibers with $(3/2)(n^2-n)+3$ interferometrically dark fibers and $(3/2)(n^2+3n)-2$ light fibers, where n is an integer greater than or equal to 1. Each optical fiber has a first end and a second end. The plurality of optical fibers are fused together along a section of each optical fiber proximate the first end of each optical fiber to form a fused section having a fiber axis. The fused section of the plurality of optical fibers is tapered to form a tapered region. A facet is at an end of the fused section. The facet is disposed in a direction perpendicular to the fiber axis.

U.S. Pat. No. 5,907,436 titled "Multilayer dielectric diffraction gratings" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

Other patents that can be used with or in the present invention include U.S. Pat. No. 6,172,812 (hereinafter, "Haaland et al."), titled "ANTI-REFLECTION COATINGS AND COATED ARTICLES", issued Jan. 9, 2001; U.S. Pat. No. 6,406,197 (hereinafter, "Okuda et al."), titled "OPTICAL FIBER COUPLER, A PROCESS FOR FABRICATING THE SAME AND AN OPTICAL AMPLIFIER USING THE SAME", issued Jun. 18, 2002; U.S. Pat. No. 6,178,779 (hereinafter, "Drouart et al."), titled "BUTT WELDING OPTICAL FIBER PREFORMS WITH A PLASMA TORCH", issued Jan. 30, 2001; U.S. Pat. No. 7,416,347 (hereinafter, "Livingston et al."), titled "OPTICAL FIBER ARRAY CONNECTIVITY SYSTEM WITH INDICIA TO FACILITATE CONNECTIVITY IN FOUR ORIENTATIONS FOR DUAL FUNCTIONALITY", issued Aug. 26, 2008; U.S. Pat. No. 7,707,541 (hereinafter, "Abrams et al."), titled "SYSTEMS, MASKS, AND METHODS FOR PHOTOLITHOGRAPHY", issued Apr. 27, 2010; U.S. Pat. No. 6,614,965 (hereinafter, "Yin"), titled "EFFICIENT COUPLING OF OPTICAL FIBER TO OPTICAL COMPONENT", issued Sep. 2, 2003; U.S. Pat. No. 7,128,943 (hereinafter, "Djeu"), titled "METHODS FOR FABRICATING LENSES AT THE END OF OPTICAL FIBERS IN THE FAR FIELD OF THE FIBER APERTURE", issued Oct. 31, 2006; U.S. Pat. No. 3,728,117 (hereinafter, "Heidenhain et al."), titled "OPTICAL DIFFRACTION GRID", issued Apr. 17, 1973; U.S. Pat. No. 4,895,790 (hereinafter, "Swanson et al."), titled "HIGH-EFFICIENCY, MULTILEVEL, DIFFRACTIVE OPTICAL ELEMENTS", issued Jan. 23, 1990; U.S. Pat. No. 6,822,796 (hereinafter, "Takada et al."), titled "DIFFRACTIVE OPTICAL ELEMENT", issued Nov. 23, 2004; U.S. Pat. No. 6,958,859 (hereinafter, "Hoose et al."), titled "GRATING DEVICE WITH HIGH DIFFRACTION EFFICIENCY", issued Oct. 25, 2005; U.S. Pat. No. 7,680,170 (hereinafter, "Hu et al."), titled "COUPLING DEVICES AND METHODS FOR STACKED LASER EMITTER ARRAYS", issued Mar. 16, 2010; which are each incorporated herein by reference. Each of these references describes optical systems and/or components that can be combined with and/or used in various embodiments of the present invention.

There is a need for an improved optical-fiber array method and apparatus, particularly optical-fiber arrays having improved power handling and functionality.

BRIEF SUMMARY OF THE INVENTION

In some embodiments, the present invention provides an apparatus that includes a plurality of optical fibers including a first optical fiber and a second optical fiber, wherein the first optical fiber is configured to transmit a first optical signal, and wherein the second optical fiber is configured to transmit a second optical signal, and a fiber-array plate (e.g., in some embodiments, a monolithic glass or fused-quartz plate) configured to receive the plurality of optical signals from the plurality of optical fibers and emit a composite output beam (in some embodiments, the composite output beam includes a plurality of output beams), wherein the fiber-array plate includes a first surface and a second surface, wherein the plurality of optical fibers are configured to connect to the first surface of the fiber-array plate (e.g., in some embodiments, the plurality of optical fibers are butt welded to the first surface of the fiber-array plate). In some embodiments, the first surface of the fiber-array plate includes indicia configured to assist in aligning the plurality of optical fibers on the fiber-array plate. In some embodiments, the apparatus includes beam-shaping structures (e.g., lenslets and/or diffractive surface or volume gratings) configured to shape the plurality of emitted output beams).

In some embodiments, the present invention provides a method that includes providing a plurality of optical fibers including a first optical fiber and a second optical fiber, providing a fiber-array plate, wherein the fiber-array plate includes a first surface and a second surface, connecting the plurality of optical fibers to the first surface of the fiber-array plate (e.g., by fusing, butt welding, or the like), transmitting a plurality of optical signals through the plurality of optical fibers and into the fiber-array plate at the first surface of the fiber-array plate, and emitting a composite output beam (in some embodiments, the emitting of the composite output beam includes emitting a plurality of output beams) from the second surface of the fiber-array plate.

BRIEF DESCRIPTION OF THE FIGURES

Each of the items shown in the following brief description of the drawings represents some embodiments of the present invention.

FIG. 1A1 is a schematic perspective view of an optical-fiber array assembly 101.1 having equal-spaced fiber connections to a base plate 110.

FIG. 1A2 is a schematic perspective view of an optical-fiber array assembly 101.2 having unequal-spaced fiber connections to a base plate 110.

FIG. 1B1 is a schematic perspective view of an optical-fiber array assembly 102.1.

FIG. 1B2 is a schematic perspective view of an optical-fiber array assembly 102.2.

FIG. 1C1 is a schematic perspective view of an optical-fiber array assembly 103.1.

FIG. 1C2 is a schematic perspective view of an optical-fiber array assembly 103.2.

FIG. 2A is a schematic end view of an optical-fiber-array assembly 201.

FIG. 2B is a schematic end view of an optical-fiber-array assembly 202.

FIG. 2C is a schematic end view of an optical-fiber-array assembly 203.

FIG. 2G1 is a schematic end view of an optical-fiber-array assembly 207

FIG. 2G2 is a schematic side view of assembly 207 of FIG. 2G1.

FIG. 3B1 is a schematic plan view of an optical-fiber-array assembly 302.1.

FIG. 3B2 is a schematic plan view of an optical-fiber-array assembly 302.2.

FIG. 3C1 is a schematic plan view of an optical-fiber-array assembly 3030.

FIG. 3C2 is a schematic plan view of an optical-fiber-array assembly 3031.

FIG. 4A is a schematic side view of an optical-fiber-array assembly 401.

FIG. 4B is a schematic side view of an optical-fiber-array assembly 402.

FIG. 4C1 is a schematic side view of an optical-fiber-array assembly 403.1.

FIG. 4C2 is a schematic side view of an optical-fiber-array assembly 403.2.

FIG. 5A1 is a schematic plan view of a spectral beam combiner 500.1 that includes an optical-fiber-array assembly 501.

FIG. 5A2 is a schematic plan view of a spectral beam combiner 500.2 that includes an optical-fiber-array assembly 501.

FIG. 5A3 is a schematic perspective view of a spectral beam combiner 500.2 that includes an optical-fiber-array assembly 501.

FIG. 6A1 is a schematic perspective view of an optical-fiber-array assembly 601.

FIG. 6A2 is a schematic cross-section view (across plane 670 of FIG. 6A1) of assembly 601 that includes an output window 661 at second surface 612 according to some embodiments of the invention.

FIG. 6A3 is a schematic cross-section view (across plane 670 of FIG. 6A1) of assembly 601 that includes an output lenslet 664 for each of a plurality of output beams at second surface 612 according to some embodiments of the invention.

FIG. 6A4 is a schematic cross-section view (across plane 670 of FIG. 6A1) of an assembly 601 that includes an output meniscus (concave-convex) lenslet 665 for each of a plurality of output beams at second surface 612 according to some embodiments of the invention.

FIG. 6D is a schematic plan view of optical-fiber-array assembly 603 of FIG. 6C.

DETAILED DESCRIPTION OF THE INVENTION

Figure 1D:
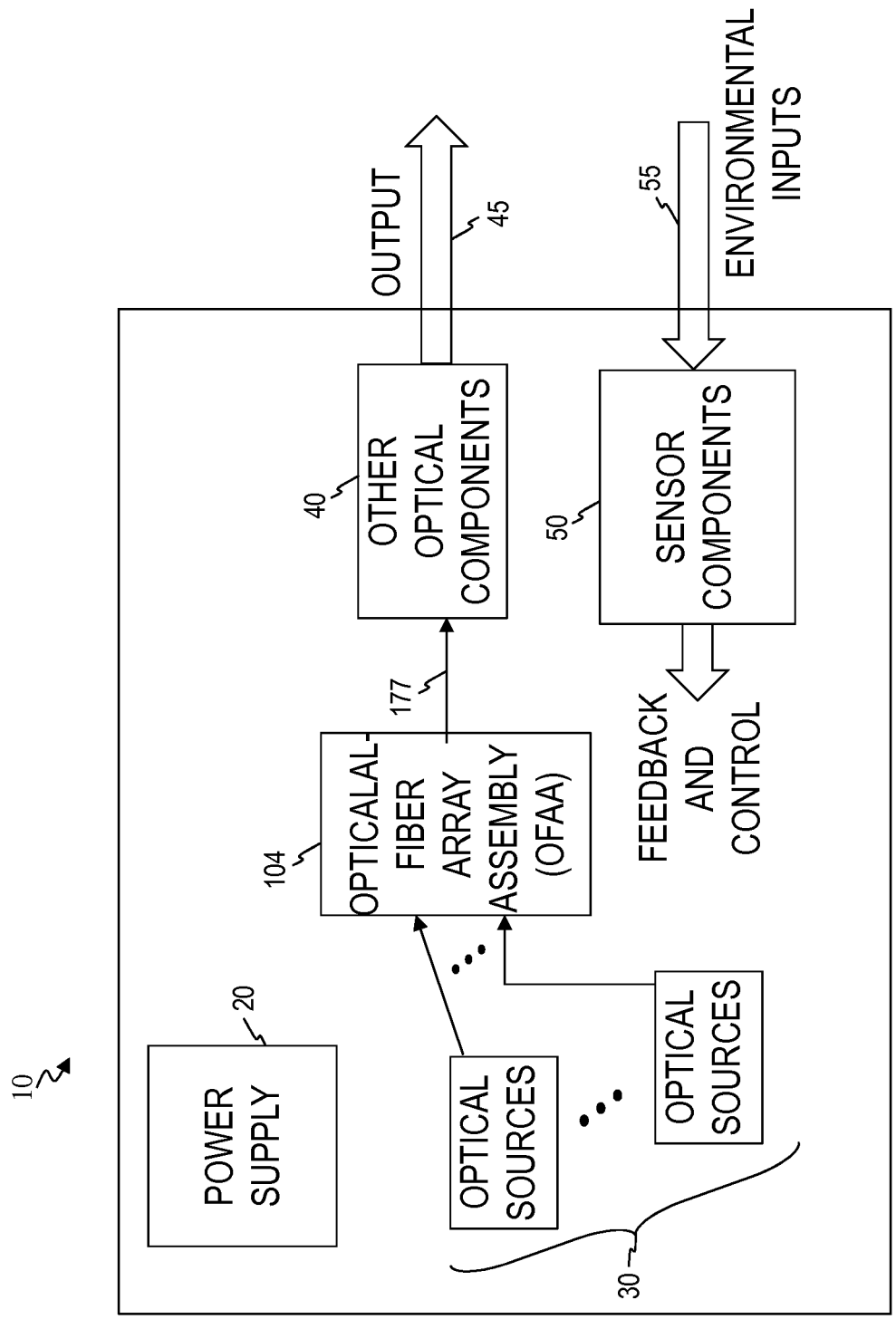
FIG. 1D is a diagram of an overall system 10 that includes a plurality of assemblies including an optical-fiber-array assembly (OFAA) 104.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As used herein, an optical signal (the signal) is light (of any suitable wavelength including ultraviolet and infrared wavelengths as well as visible wavelengths) of a signal wavelength being amplified, or of a laser output (and may or may not be modulated with information).

FIG. 1A1 is a schematic perspective view of an optical-fiber-array assembly 101.1 having equal-spaced fiber connections to a base plate 110. In some embodiments, optical-fiber-array assembly 101.1 includes a base plate 110 and a plurality of optical fibers 130 that are attached to a first surface 111 of base plate 110. In some embodiments, base plate 110 includes a top major face 116. In some embodiments, optical signals transmitted through the plurality of optical fibers 130 are transmitted into base plate 110 at first surface 111, transmitted through base plate 110, and then emitted as a composite output beam 177 from base plate 110 at a second surface 112 of base plate 110. In some embodiments, the composite output beam 177 includes a plurality of output beams, wherein the shape of the plurality of output beams (i.e., whether the beams are focused, collimated, diverged, polarized, interfering or the like) is based on the geometries of the plurality of optical fibers 130 and on the geometry of base plate 110 and the characteristics of the optical signals supplied by the optical fibers 130. In some embodiments, the composite output light pattern (also called composite "beam") 177 (e.g., in some embodiments, a plurality of output beams) include a plurality of wavelengths (in some such embodiments, each one of the plurality of output beams has a unique wavelength). FIG. 1A2 is a schematic perspective view of an optical-fiber-array assembly 101.2. In some embodiments, optical-fiber-array assembly 101.2 includes a base plate 110 and a plurality of optical fibers 130 that are attached to a first surface 111 of base plate 110 at a fiber-to-fiber spacing that varies. For example, in some embodiments, optical fibers 130.1 and 130.2 are separated from each other by a first distance that is greater than the distance between 130.J and 130.K and greater than the distance between 130.N–1 and 130.N.

In some embodiments of all the embodiments shown in the various figures herein, a base plate 110 (or 210, 310, 410, 501o or 501i) is made of very pure glass and absorbs very little light internally, and because the input fibers are fused directly to the base plate 110, very little light is absorbed at the input face 111 interface. In some embodiments, the expanded beam size inside base plate 110 also improves power-handling capability over prior-art fiber arrays. Thus the continuous-power-handling capability can achieve up to one megawatt or more, and the peak-power-handling capability can achieve up to one hundred megawatts or more.

For example, in some embodiments, composite output beam 177 exhibits peak power of at least 0.1 megawatts (MW). In some embodiments, composite output beam 177 exhibits peak power of at least 0.2 MW. In some embodiments, composite output beam 177 exhibits peak power of at least 0.4 MW. In some embodiments, composite output beam 177 exhibits peak power of at least 0.6 MW. In some embodiments, composite output beam 177 exhibits peak power of at least 0.8 MW. In some embodiments, composite output beam 177 exhibits peak power of at least 1 MW. In some embodiments, composite output beam 177 exhibits peak power of at least 2 MW. In some embodiments, composite output beam 177 exhibits peak power of at least 4 MW. In some embodiments, composite output beam 177 exhibits peak power of at least 6 MW. In some embodiments, composite output beam 177 exhibits peak power of at least 8 MW. In some embodiments, composite output beam 177 exhibits peak power of at least 10 MW. In some embodiments, composite output beam 177 exhibits peak power of at least 20 MW. In some embodiments, composite output beam 177 exhibits peak power of at least 40 MW. In some embodiments, composite output beam 177 exhibits peak power of at least 60 MW. In some embodiments, composite output beam 177 exhibits peak power of at least 80 MW. In some embodiments, composite output beam 177 exhibits peak power of at least 100 MW.

In some embodiments, composite output beam 177 exhibits continuous wave (CW) average power of at least 100 watts (W). In some embodiments, composite output beam 177 exhibits CW average power of at least 200 W. In some embodiments, composite output beam 177 exhibits CW average power of at least 300 W. In some embodiments, composite output beam 177 exhibits CW average power of at least 400 W. In some embodiments, composite output beam 177 exhibits CW average power of at least 500 W. In some embodiments, composite output beam 177 exhibits CW average power of at least 750 W. In some embodiments, composite output beam 177 exhibits CW average power of at least 1 kilowatt (KW). In some embodiments, composite output beam 177 exhibits CW average power of at least 2 KW. In some embodiments, composite output beam 177 exhibits CW average power of at least 4 KW. In some embodiments, composite output beam 177 exhibits CW average power of at least 6 KW. In some embodiments, composite output beam 177 exhibits CW average power of at least 8 KW. In some embodiments, composite output beam 177 exhibits CW average power of at least 10 KW. In some embodiments, composite output beam 177 exhibits CW average power of at least 20 KW. In some embodiments, composite output beam 177 exhibits CW average power of at least 40 KW. In some embodiments, composite output beam 177 exhibits CW average power of at least 60 KW. In some embodiments, composite output beam 177 exhibits CW average power of at least 80 KW. In some embodiments, composite output beam 177 exhibits CW average power of at least 100 KW. In some embodiments, composite output beam 177 exhibits CW average power of at least 200 KW. In some embodiments, composite output beam 177 exhibits CW average power of at least 400 KW. In some embodiments, composite output beam 177 exhibits CW average power of at least 500 KW. In some embodiments, composite output beam 177 exhibits CW average power of at least one megawatt (1 MW). In some embodiments, composite output beam 177 exhibits CW average power of at least 2 MW. In some embodiments, composite output beam 177 exhibits CW average power of at least 5 MW.

In some embodiments, such as illustrated in FIG. 1A1, second surface 112 is a flat surface. In some embodiments, an anti-reflective (AR) coating is applied to second surface 112 to improve light transmission through base plate 110. One advantage of the present invention is that it is generally much easier to AR-coat the single output face of base plate 110 than to AR-coat the tips of fibers 130 or apply a separate end cap applied to each of a plurality of fibers. A method for anti-reflective coating usable with the present invention is described in U.S. Pat. No. 6,172,812 (hereinafter, "Haaland et al."), titled "ANTI-REFLECTION COATINGS AND COATED ARTICLES", issued Jan. 9, 2001, and incorporated herein by reference. Haaland et al. describe coated optical substrates and a method of coating optical substrates with anti-reflective (AR) coatings. The composition of the coating is determined by material constraints such as adhesion, durability, ease of manufacture, and cost. The thickness of one or more layers of AR material is determined by minimizing the product of the Fresnel reflection coefficients for the coated article with the angle- and wavelength-dependent sensitivity of the human visual system.

In some embodiments, an AR-coating is applied to first surface 111 and second surface 112. A method for AR-coating first surface 111 usable with the present invention is described in U.S. Pat. No. 6,614,965 (hereinafter, "Yin"), titled "EFFICIENT COUPLING OF OPTICAL FIBER TO OPTICAL COMPONENT", issued Sep. 2, 2003, and incorporated herein by reference. Yin describes a method of preparing an optical component for coupling with an optical fiber. The method includes determining a thickness of a buffer layer formed on the optical component. The method also includes forming an anti reflective coating adjacent to the buffer layer. The anti reflective coating is formed to a thickness selected in response to the determined buffer layer thickness. In some embodiments, the AR-coating on first surface 111 and/or second surface 112 is omitted and fibers 130 are glued or adhered (e.g., in some embodiments, using an index-matching adhesive that is transparent at least at the signal wavelength(s)) to first surface 111.

In some embodiments, such as illustrated in FIG. 1A, fibers 130 are attached to first surface 111 of base plate 110 such that fibers 130 are adjacent and substantially parallel to each other, and wherein the longitudinal axis of each fiber is substantially perpendicular to the face of first surface 111. In some such embodiments, the material of the base plate 110 is selected to have an index of refraction that matches the index of refraction of the core of the fibers 130, in order to minimize reflections at the fiber-base plate boundary. In other embodiments (see, e.g., FIG. 4E), at least a first portion of fibers 130 attach to first surface 111 at a first angle that is other than perpendicular, in order that any reflections from the fiber-core to base plate boundary do not get coupled in a backward-propagating direction in the core but rather leak out the sides of the fiber. In some such embodiments (e.g., see FIG. 4F), at least a second portion of fibers 431 attach to first surface 411 at a second angle that is different than the first angle. In still other embodiments, fibers 130 are attached to first surface 111 of base plate 110 in any other suitable configuration.

In some embodiments, each one of the plurality of optical fibers 130 has a length of at least 500 millimeters (mm). In some embodiments, each one of the plurality of optical fibers 130 has a length of less than 500 mm. In some embodiments, each one of the plurality of optical fibers 130 has a length of about 500 mm to about 1 meter (m). In some embodiments, each one of the plurality of optical fibers 130 has a length of between about 500 mm and about 600 mm, a length of between about 600 mm and about 700 mm, a length of between about 700 mm and about 800 mm, a length of between about 800 mm and about 900 mm, a length of between about 900 mm and about 1000 mm. In some embodiments, each one of the plurality of optical fibers 130 has a length of at least 1 m. In some embodiments, each one of the plurality of optical fibers 130 has a length of about 1 m to about 100 m. In some embodiments, each one of the plurality of fibers 130 has a length of between about 1 m and about 5 m, a length of between about 5 m and about 10 m, a length of between about 10 m and about 50 m, a length of between about 50 m and about 100 m. In some embodiments, each one of the plurality of fibers 130 has a length of at least 100 m. In some embodiments, the optical fibers 130 are coiled.

In some embodiments, the plurality of fibers 130 includes at least two fibers. In some embodiments, the plurality of fibers 130 includes at least four fibers. In some embodiments, the plurality of fibers 130 includes at least eight fibers. In some embodiments, the plurality of fibers 130 includes at least 10 fibers. In some embodiments, the plurality of fibers 130 includes at least 20 fibers. In some embodiments, the plurality of fibers 130 includes at least 25 fibers. In some embodiments, the plurality of fibers 130 includes at least 50 fibers. In some embodiments, the plurality of fibers 130 includes at least 75 fibers. In some embodiments, the plurality of fibers 130 includes at least 100 fibers. In some embodiments, the plurality of fibers 130 includes at least 150 fibers. In some embodiments, the plurality of fibers 130 includes at least 200 fibers. In some embodiments, the plurality of fibers 130 includes at least 250 fibers. In some embodiments, the plurality of fibers 130 includes more than 250 fibers.

In some embodiments, base plate 110 is formed from a monolithic material. (In some other embodiments (see FIG. 6A1-FIG. 6D below), a corresponding hollow base plate is formed having an interior space that air-filled or that has a vacuum.) In some embodiments, base plate 110 is made from a material that includes glass. In some embodiments, base plate 110 is made from a material that includes fused silica (in some such embodiments, base plate 110 is made from monolithic fused silica). In some embodiments, base plate 110 is made from a material that includes fused quartz (in some such embodiments, base plate 110 is made from fused quartz). In some embodiments, base plate 110 is made from substantially the same material as that of the plurality of optical fibers 130. In some embodiments, base plate 110 is made from any other suitable material capable of transmitting the optical signals received from the plurality of optical fibers 130.

In some embodiments, base plate 110 is about 1 to 1.2 mm thick (in the Z direction of light propagation) by 75 mm (in the X direction) by 25 mm high (in the Y direction) (about the size of certain standard microscope slides). In some embodiments, base plate 110 is about 1.2 mm thick (in the Z direction of light propagation) by 25 mm (in the X direction) by 10 mm high (in the Y direction). In other embodiments, base plate 110 is about 10 mm (in the Z direction of light propagation) by 25 mm (in the X direction) by 1 mm high (in the Y direction) or any other suitable size. In some embodiments, the optical fibers are about 500 microns (0.5 mm) (or any other suitable size) in outside diameter. In some other embodiments, the optical fibers are about 1000 microns (1 mm) or more in outside diameter (such sizes of optical fibers are often termed optical rods, but for the purposes of this disclosure are still referred to as optical fibers). In some embodiments, the optical fibers have lengthwise holes that define the optical waveguides and are termed photonic-crystal fibers, but for the purposes of this disclosure are also still referred to as optical fibers.

In some embodiments, the plurality of fibers 130 are directly attached to first surface 111 of base plate 110 to form a substantially seamless interface for light transmission between the plurality of fibers 130 and base plate 110. In some embodiments, fibers 130 are glued (using an index-matching adhesive that is transparent at least at the signal wavelength(s)) to first surface 111. In some embodiments, fibers 130 are fused to first surface 111 (e.g., using laser welding or other suitable methods). A method for fusing optical fibers usable with the present invention is described in U.S. Pat. No. 6,406,197 (hereinafter, "Okuda et al."), titled "OPTICAL FIBER COUPLER, A PROCESS FOR FABRICATING THE SAME AND AN OPTICAL AMPLIFIER USING THE SAME", issued Jun. 18, 2002, and incorporated herein by reference. Okuda et al. describe an optical fiber coupler fabricated by the steps of jointing a single mode fiber with a rare earth-doped fiber by fusing abutted end faces of both fibers to form a combined fiber; and fusing parallel contact parts of a quasi rare earth-doped fiber and of the rare earth-doped fiber of the combined fiber and then elongating the fused parts in a desired diameter to form a fused-stretch fiber portion. In some embodiments, the method described by Okuda et al. is modified such that fibers 130 are suitably fused to surface 111.

In some embodiments, fibers 130 are attached to first surface 111 by laser (or other) welding, soldering, or the like. In some embodiments, fibers 130 are butt-welded to first surface 111. A method for butt welding optical fibers usable with the present invention is described in U.S. Pat. No. 6,178,779 (hereinafter, "Drouart et al."), titled "BUTT WELDING OPTICAL FIBER PREFORMS WITH A PLASMA TORCH", issued Jan. 30, 2001, and incorporated herein by reference. Drouart et al. describe a method of assembling two optical fiber preforms together end-to-end, the method including the following operations: the two cylindrical preforms are placed in alignment along a common longitudinal axis; the preforms are rotated about the common longitudinal axis; the facing ends of said preforms are heated by a heater; and the preforms are moved towards each other parallel to the common axis to press them against each other so as to form intimate contact between the ends after cooling. In some embodiments, the method described by Drouart et al. is modified such that fibers 130 are suitably butt welded to surface 111.

In some embodiments, first surface 111 of base plate 110 includes indicia 115 that assist in positioning the fibers 130 in the proper location on first surface 111 (in some embodiments, for example, indicia 115 includes registration lines and datum indicating where to align and fuse the various fibers 130 to base plate 110). The use of indicia 115 simplifies fiber alignment and increases the precision of forming fiber-array 110. In some embodiments, indicia 115 includes, for example, lines, shapes, letters, or any other suitable visual depictions that indicate the proper positioning of fibers 130. In some embodiments, indicia 115 include visual indications of the proper polarization alignment of fibers 130 (in some such embodiments, the plurality of fibers 130 are shaped to correspond to the polarization-alignment indicia 115; see, for example, FIG. 2C).

A method for using indicia to align an optical fiber array usable with the present invention is described in U.S. Pat. No. 7,416,347 (hereinafter, "Livingston et al."), titled "OPTICAL FIBER ARRAY CONNECTIVITY SYSTEM WITH INDICIA TO FACILITATE CONNECTIVITY IN FOUR ORIENTATIONS FOR DUAL FUNCTIONALITY", issued Aug. 26, 2008, and incorporated herein by reference. Livingston et al. describe a fan-out unit for a data communication system that includes: a plurality of optical fibers; and a faceplate with a plurality of ports arranged in at least one row, each of the ports being optically interconnected with a respective one of the optical fibers and configured to receive a mating optical fiber. The faceplate includes a first visual indicia associated with the ports that indicates an arrangement in which mating optical fibers are to be inserted into the ports, the first visual indicia being easily readable when the faceplate is in either a first horizontal orientation or a first vertical orientation, but not being easily readable when the faceplate is in a second horizontal orientation that is inverted from the first horizontal orientation or a second vertical orientation that is inverted from the first vertical orientation.

In some embodiments, indicia 115 are etched onto first surface 111, laser engraved into first surface 111, or formed on first surface 111 in any other suitable manner. In some embodiments, indicia 115 are formed on first surface 111 using any suitable photolithography technique. A photolithography method usable with the present invention is described in U.S. Pat. No. 7,707,541 (hereinafter, "Abrams et al."), titled "SYSTEMS, MASKS, AND METHODS FOR PHOTOLITHOGRAPHY", issued Apr. 27, 2010, and is incorporated herein by reference. Abrams et al. describe a method for determining a mask pattern to be used on a photomask in a photolithographic process. During the method, a target pattern is partitioning into subsets, which are distributed to processors. Then, a set of second mask patterns, each of which corresponds to one of the subsets, is determined.

FIG. 1B1 is a schematic perspective view of an optical-fiber-array assembly 102.1 that includes a curved second surface 113.1. In some embodiments, optical-fiber-array assembly 102.1 is substantially similar to optical-fiber-array assembly 101.1 of FIG. 1A1 except that array 102.1 includes the curved second surface 113.1 instead of flat second surface 112. In some embodiments, curved second surface 113.1 has a convex curvature along the X axis of base plate 110 and no curvature along the Y axis of base plate 110 (see coordinate reference 199) such that the composite output beam 177 emitted from base plate 110 is focused or collimated in the X direction, but diverges in the Y direction (e.g., in some embodiments, curved second surface 113.1 functions as a positive cylindrical lens). In other embodiments (e.g., see FIG. 3E and FIG. 6A4), curved second surface 113.1 includes a combination of convex and concave curvature along at least one of the X axis and Y axis. FIG. 1B2 is a schematic perspective view of an optical-fiber-array assembly 102.2 that includes a curved second surface 113.2. In some embodiments, curved second surface 113.2 has a convex curvature along the X axis of base plate 110 and a convex curvature along the Y axis of base plate 110 such that the composite output beam 177 emitted from base plate 110 is focused or collimated in the X and Y directions (e.g., in some embodiments, curved second surface 113.2 functions as a positive spherical lens).

FIG. 1C1 is a schematic perspective view of an optical-fiber-array assembly 103.1 that includes a curved second surface 114.1. In some embodiments, optical-fiber-array assembly 103.1 is substantially similar to optical-fiber-array assembly 101.1 of FIG. 1A1 except that array 103.1 includes the curved second surface 114.1 instead of flat second surface 112. In some embodiments, curved second surface 114.1 has a concave curvature along the X axis of base plate 110 and no curvature along the Y axis of base plate 110 such that the composite output beam 177 emitted from optical-fiber-array assembly 110 diverges in the X and Y directions (in some such embodiments, the magnitude of divergence is greater in the X direction than in the Y direction). For example, in some embodiments, curved second surface 114.1 functions as a negative cylindrical lens. FIG. 1C2 is a schematic perspective view of an optical-fiber-array assembly 103.2 that includes a curved second surface 114.2. In some embodiments, curved second surface 114.2 has a concave curvature along the X axis of base plate 110 and a convex curvature along the Y axis of base plate 110 such that the composite output beam 177 emitted from base plate 110 diverges in the X direction and focuses or collimates in the Y direction.

FIG. 1D is a diagram of an overall system 10 that includes a plurality of assemblies including an optical-fiber-array assembly (OFAA) 104. In some embodiments, system 10 includes a power supply 20. In some embodiments, optical sources 30 transmit a plurality of optical signals into OFAA 104. In some embodiments, OFAA 104 emits a composite output beam 177 that passes through other optical components 40, and optical components 40 emit output 45 from system 10. In some embodiments, system 10 includes sensor components 50 that receive environmental inputs 55 used to provide feedback and control for system 10.

FIG. 2A is a schematic end view of an optical-fiber-array assembly 201. In some embodiments, optical-fiber-array assembly 201 includes a base plate 210 and a plurality of optical fibers 230 that are attached to a first surface 211 of base plate 210. In some embodiments, base plate 210 includes a top major face 216. In some embodiments, the plurality of optical fibers 230 are directly attached to first surface 211 of base plate 210 to form a substantially seamless interface for light transmission between the plurality of fibers 230 and base plate 210. In some embodiments, fibers 230 are glued to first surface 211. In some embodiments, fibers 230 are fused to first surface 211. In some embodiments, fibers 230 are attached to first surface 211 by laser welding, butt welding, soldering, or the like. In some embodiments, optical signals transmitted through the plurality of optical fibers 230 are transmitted into base plate 210 at first surface 211, transmitted through base plate 210, and then emitted as a composite output beam (not illustrated) from base plate 210 at a second surface (not illustrated) of base plate 210. In some embodiments, the composite output beam includes a plurality of output beams, wherein the shape of the plurality of output beams (i.e., whether the beams are focused, collimated, diverged, or the like) is based on the geometries of the plurality of optical fibers 230 and on the geometry of base plate 210. In some embodiments, the plurality of output beams includes a plurality of wavelengths (in some such embodiments, each one of the plurality of output beams has a unique wavelength). In some embodiments, indicia (e.g., in some embodiments, fiber-positioning lines) 215 augment alignment between individual fibers of the plurality of fibers 230 and between the plurality of fibers 230 and base plate 210.

FIG. 2B is a schematic end view of an optical-fiber-array assembly 202. In some embodiments, optical-fiber-array assembly 202 is substantially similar to optical-fiber-array assembly 201 of FIG. 2A except that optical-fiber-array assembly 202 includes the additional aspect that a polarization-maintaining (PM) axis 231 of each one of the plurality of fibers 230 is oriented or aligned based on fiber-positioning lines 215. In some embodiments, the PM axes 231 of all the fibers 230 are all aligned to be substantially parallel to a single plane (e.g., in some embodiments, a plane that is perpendicular to both first surface 211 and to the top major face 216 of the base plate 210).

FIG. 2C is a schematic end view of an optical-fiber-array assembly 203. In some embodiments, optical-fiber-array assembly 203 includes a plurality of optical fibers 240 that each have a cross-section having a non-circular circumference, such as a polygonal (e.g., octagon, hexagon or other suitable polygon) shape, or a curved circumference having at least one flat (e.g., a flatted side on a circular cross section). In some embodiments, each one of optical fibers 240 includes at least one cladding layer configured to carry pump light, and a non-circular circumference creates disturbances within the cladding layer that cause pump light to spread or smear the pump light across the entire volume of the cladding layer and therefore improve beam uniformity. In some such embodiments, the improvement in beam uniformity caused by the non-circular circumference primarily benefits optical components upstream (i.e., closer to the laser source along the path of light propagation) of assembly 203 (e.g., a fiber amplifier connected to optical fibers 240 at an end of optical fibers 240 opposite of assembly 203) because, in some embodiments, there is only a small amount of residual pump light present at the junction of assembly 203 and optical fibers 240. In some embodiments, a non-circular circumference is also used to assist in aligning the PM-axis 231 of the fibers 240. In some embodiments, each one of the plurality of optical fibers 240 has any other shape or index-of-refraction variation that improves pump-beam uniformity in the cladding, pump-light injection from the cladding into the core and/or signal amplification in the core, and facilitates or is suitable to assist with aligning PM axis 231 of each fiber 240 parallel to some reference plane (e.g., in some embodiments, relative to the fiber-positioning lines 215 or other indicia). For example, in some embodiments, each one of the plurality of optical fibers 240 has a core that is located off-center within the respective fiber 240 to increase the amount of pump light that enters the core and thus improve amplification efficiency.

Figure 2D:
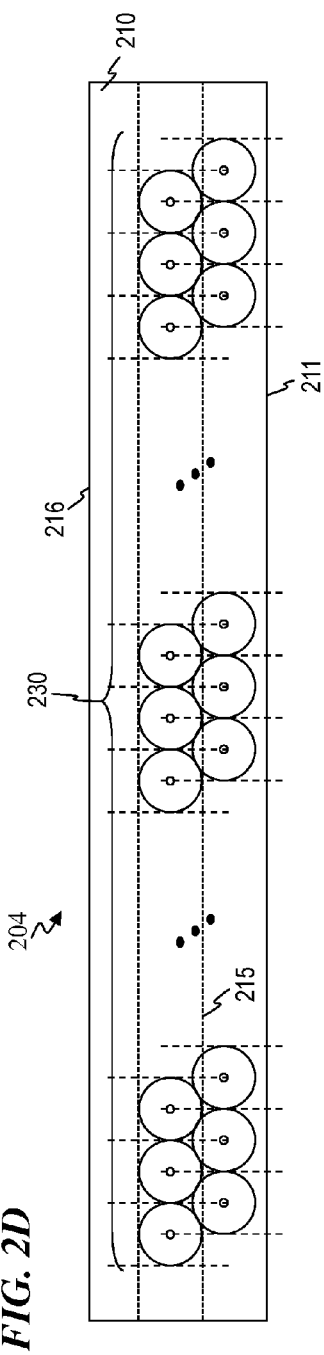
FIG. 2D is a schematic end view of an optical-fiber-array assembly 204.

FIG. 2D is a schematic end view of an optical-fiber-array assembly 204. In some embodiments, assembly 204 is substantially similar to assembly 201 of FIG. 2A except that the plurality of fibers 230 are attached to first surface 211 in two rows of fibers instead of a single row. In some embodiments, using two rows of fibers instead of a single row reduces the overall footprint required for assembly 204. In some embodiments, two or more rows of fibers are arranged in a suitable configuration other than the off-set configuration illustrated by FIG. 2D (e.g., see FIG. 2G1).

Figure 2E:
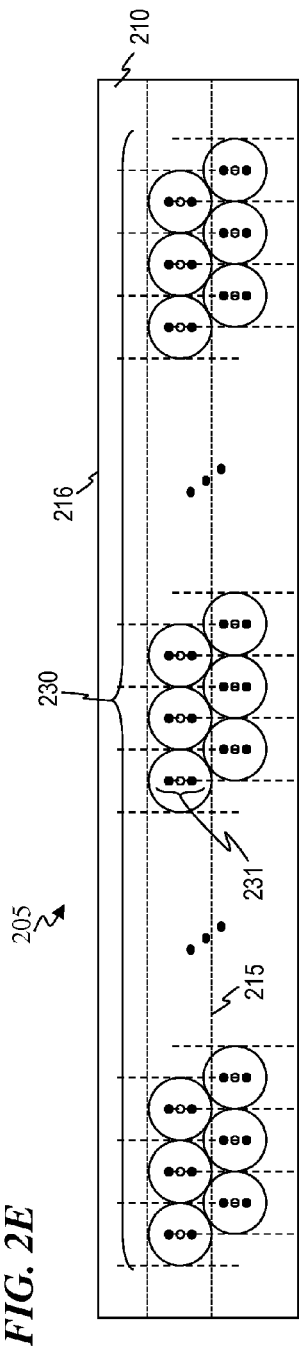
FIG. 2E is a schematic end view of an optical-fiber-array assembly 205.

FIG. 2E is a schematic end view of an optical-fiber-array assembly 205. In some embodiments, assembly 205 is substantially similar to assembly 202 of FIG. 2B except that the plurality of fibers 230 are attached to first surface 211 in two rows of fibers instead of a single row.

Figure 2F:
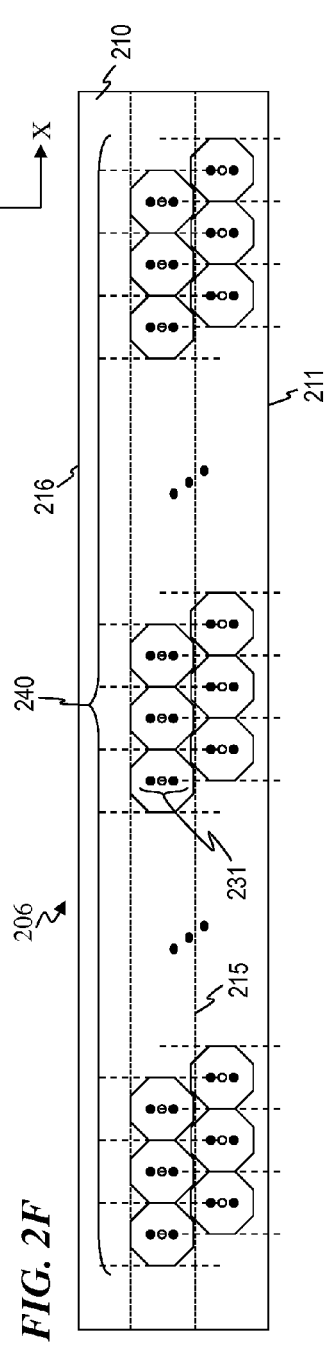
FIG. 2F is a schematic end view of an optical-fiber-array assembly 206.

FIG. 2F is a schematic end view of an optical-fiber-array assembly 206. In some embodiments, assembly 206 is substantially similar to assembly 203 of FIG. 2C except that the plurality of fibers 240 are attached to first surface 211 in two rows of fibers instead of a single row.

FIG. 2G1 is a schematic end view of an optical-fiber-array assembly 207. In some embodiments, assembly 207 is substantially similar to assembly 205 of FIG. 2E except that the plurality of fibers 230 are attached to first surface 211 in two rows (236 and 237) directly in line with each other (as opposed to the off-set configuration of the two rows of fibers 230 illustrated in FIG. 2E). In some embodiments, assembly 207 further distinguishes from assembly 205 because one row of fibers 236 has a PM axis 232 while the other row of fibers 237 has a PM axis 233 that is substantially perpendicular to the PM axis 232. In some embodiments, base plate 210 includes a polarization combiner (e.g., a structure such that the two sets of polarized beams overlap or combine) at the output end of base plate 210 that combines the two different polarizations of the two rows of fibers 230 into a merged output 234 that is substantially unpolarized if the relative intensities of the light signals having PM axis 232 and the light signals having PM axis 233 are substantially equal in power. Some of the polarization combiners that can be used with the present invention are described by U.S. Pat. No. 7,680,170 (hereinafter, "Hu et al."), titled "COUPLING DEVICES AND METHODS FOR STACKED LASER EMITTER ARRAYS", issued Mar. 16, 2010, which is incorporated herein by reference (see, for example, FIG. 8, FIG. 9, and FIG. 10 of Hu et al.).

FIG. 2G2 is a schematic side view of assembly 207 of FIG. 2G1.

Figure 3A:
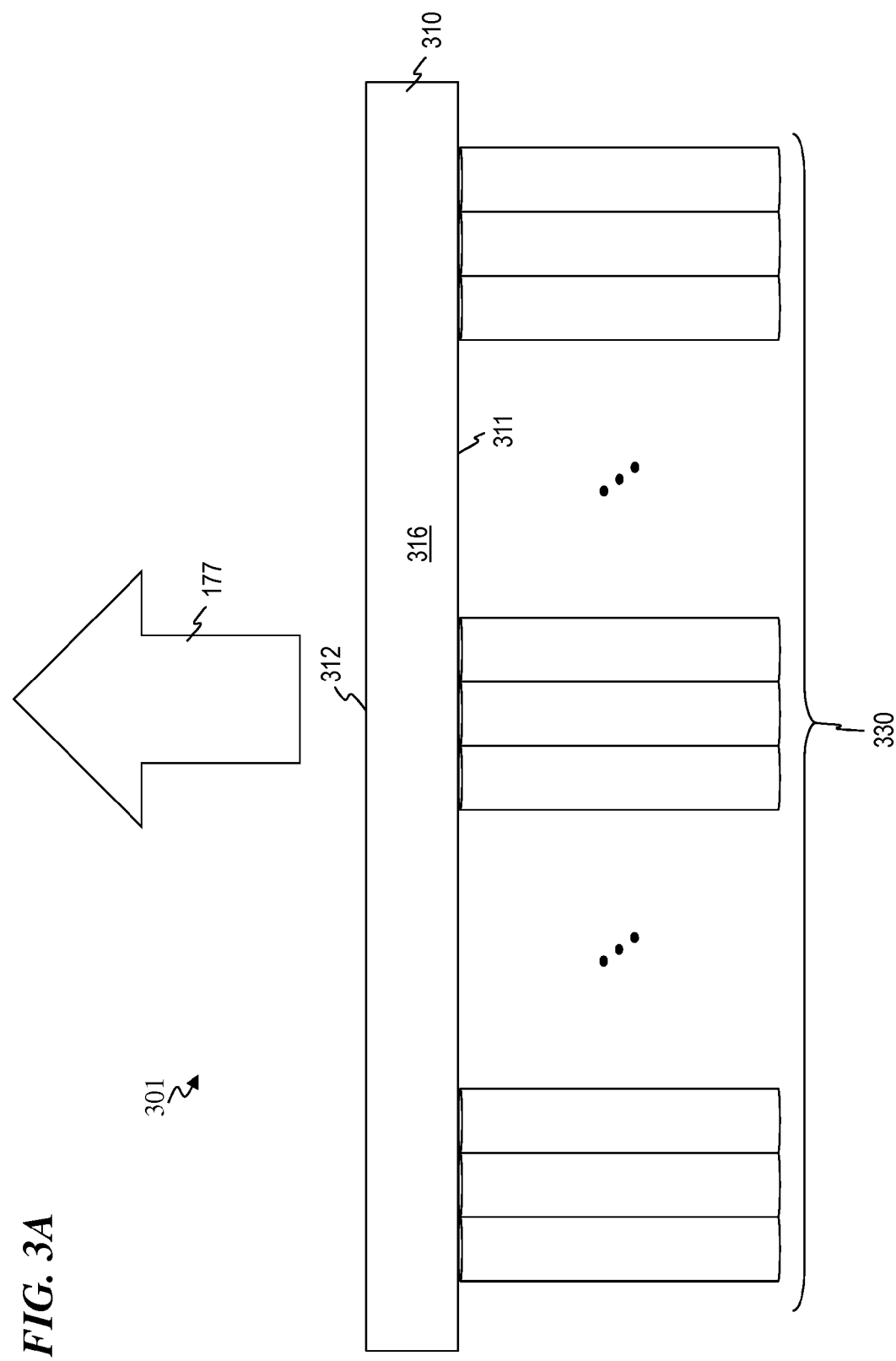
FIG. 3A is a schematic plan view of an optical-fiber-array assembly 301.

FIG. 3A is a schematic plan view of an optical-fiber-array assembly 301. In some embodiments, optical-fiber-array assembly 301 includes a base plate 310 and a plurality of optical fibers 330 that are attached to a first surface 311 of base plate 310. In some embodiments, base plate 310 includes a top major face 316. In some embodiments, fibers 330 are glued to first surface 311. In some embodiments, fibers 330 are fused to first surface 311. In some embodiments, fibers 330 are attached to first surface 311 by laser welding, butt welding, soldering, or the like. In some embodiments, optical signals transmitted through the plurality of optical fibers 330 are transmitted into base plate 310 at first surface 311, transmitted through base plate 310, and then emitted as a composite output beam 177 (which, in some embodiments, includes a plurality of output beams) from base plate 310 at a second surface 312 of base plate 310. In some embodiments, second surface 312 is flat. In some embodiments, an anti-reflective (AR)-coating is applied to second surface 312 to improve light transmission through base plate 310 (in some such embodiments, first surface 311 is not AR-coated).

FIG. 3B1 is a schematic plan view of an optical-fiber-array assembly 302.1 that includes a curved second surface 313.1. In some embodiments, optical-fiber-array assembly 302.1 is substantially similar to optical-fiber-array assembly 301 of FIG. 3A except that optical-fiber-array assembly 302.1 includes the curved second surface 313.1 instead of flat second surface 312. In some embodiments, curved second surface 313.1 has a curvature that is substantially similar to curved second surface 113.1 of FIG. 1B1 (i.e., in some embodiments, curved second surface 313.1 functions as a positive cylindrical lens). FIG. 3B2 is a schematic plan view of an optical-fiber-array assembly 302.2 that includes a curved second surface 313.2. In some embodiments, curved second surface 313.2 has a curvature that is substantially similar to curved second surface 113.2 of FIG. 1B2 (i.e., in some embodiments, curved second surface 313.2 functions as a positive spherical lens).

FIG. 3C1 is a schematic plan view of an optical-fiber-array assembly 3030. In some embodiments, optical-fiber-array assembly 3030 is substantially similar to optical-fiber-array assembly 301 of FIG. 3A except that optical-fiber-array assembly 3030 includes a curved second surface 314 instead of flat second surface 312. In some embodiments, curved second surface 314 has a curvature that is substantially similar to curved second surface 114.1 of FIG. 1C1 (i.e., in some embodiments, curved second surface 314 functions as a negative cylindrical lens).

FIG. 3C2 is a schematic plan view of an optical-fiber-array assembly 3031. In some embodiments, optical-fiber-array assembly 3031 is substantially similar to optical-fiber-array assembly 301 of FIG. 3A except that optical-fiber-array assembly 3031 includes a plurality of lenslets 350 on a concave-curved second surface 314 instead of flat second surface 312. In some embodiments, concave-curved second surface 314 has a curvature that synergistically operates with the collimating lenslets 350 to form a plurality of converging collimated beams.

Figure 3D:
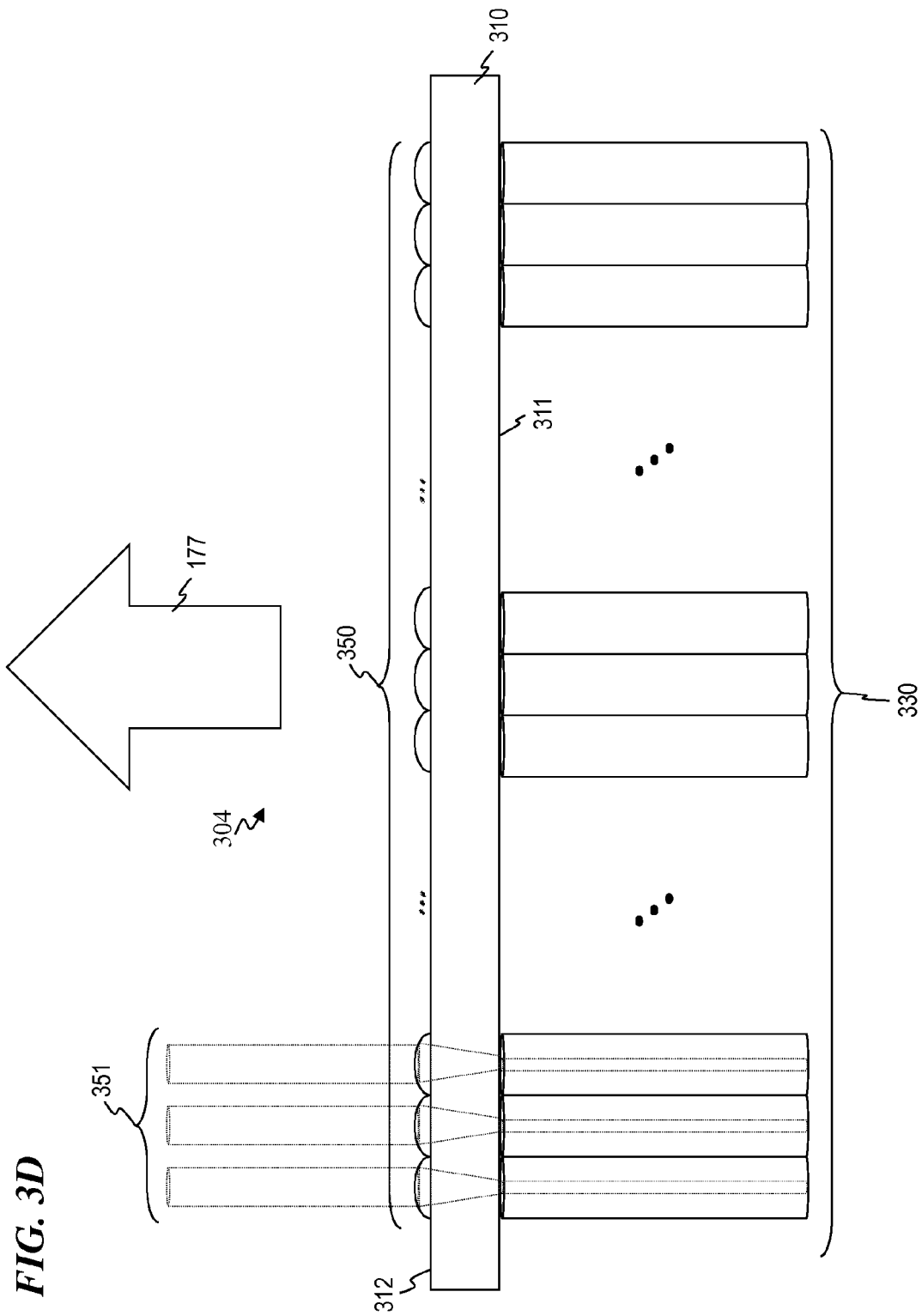
FIG. 3D is a schematic plan view of an optical-fiber-array assembly 304.

FIG. 3D is a schematic plan view of an optical-fiber-array assembly 304. In some embodiments, optical-fiber-array assembly 304 is substantially similar to optical-fiber-array assembly 301 of FIG. 3A except that optical-fiber-array assembly 304 includes a plurality of lenslets (or other optical elements such as curved refractive (e.g., biconvex, planoconvex, positive meniscus, negative meniscus, plano-concave, biconcave, or compound lenses) or reflective surfaces (e.g., curved mirrors that reflect and focus the output beams through the top surface 316 (see FIG. 3B1) or bottom surface), GRIN lenses (graded-index fiber lenses), holographic, diffractive, or grating structures, or other optical elements) 350 configured to shape (e.g., focus, collimate, diverge, or the like) individual output beams of the composite output beam 177 of optical-fiber-array assembly 304. For example, in some embodiments, individual optical signals are transmitted through optical-fiber-array assembly 304 such that the plurality of output beams associated with the individual optical signals are emitted as collimated output beams 351 from optical-fiber-array assembly 304. In some embodiments, lenslets 350 are further configured to reduce aberration. In some embodiments, lenslets 350 are formed separately from base plate 310 and then later affixed to second surface 312 of base plate 310 by fusing, butt (or other) welding, gluing or the like. In other embodiments, lenslets 350 are formed as part of base plate 310. A method for fabricating lenslets usable with the present invention is described in U.S. Pat. No. 7,128,943 (hereinafter, "Djeu"), titled "METHODS FOR FABRICATING LENSES AT THE END OF OPTICAL FIBERS IN THE FAR FIELD OF THE FIBER APERTURE", issued Oct. 31, 2006, and incorporated herein by reference. Djeu describe a microlens is affixed in the far field of an optical fiber to spatially transform a beam either entering or exiting the fiber. In a first embodiment, a droplet of photo polymer is placed on the end of an optical fiber and the fiber is spun to create an artificial gravity. The droplet is cured by UV radiation during the spinning. In some embodiments, the method described by Djeu is modified such that lenslets 350 are suitably formed on surface 312 of base plate 310.

In some embodiments, a plurality of lenslets 319 located between the ends of each of a plurality of fibers 330 are formed using very short sections of focussing GRIN fibers fused to the light-output ends of the fibers as described in U.S. Provisional Patent Application 61/343,948 filed on Apr. 12, 2010, titled "High Beam Quality and High Average Power from Large-Core-Size Optical-Fiber Amplifiers; Signal and Pump Mode-Field Adaptor for Double-Clad Fibers and Associated Method" by Matthias Savage-Leuchs et al., wherein the opposite ends of the very short sections of GRIN lenslets 319 are then fused or glued to the base plates as described herein, and GRIN lenslets 319 perform a focussing function on the input light going into base plate 310. In some embodiments, very short sections of focussing GRIN fibers (not shown) are fused to the output face 314 of base plate 310, in place of the lenslets 350 shown in FIG. 3C2, and perform a focussing function on the output light. In some embodiments, diffraction gratings or holograms or other focussing elements (not shown) are formed on the output face 314 of base plate 310, in place of the lenslets 350 shown in FIG. 3C2, and perform a focussing function on the output light. In some embodiments, the very short sections of input focussing GRIN fibers 319 are omitted and the fibers 330 are fused directly to the input face 311 of base plate 310 (as described for FIG. 3C1).

In some embodiments, lenslets 350 are formed by a high-power laser (e.g., in some embodiments, a carbon dioxide ($CO_2$) laser) in a process such as used by OZ Optics, 219 Westbrook Road, Ottawa, Ontario, KOA 1LO, Canada, to form tapered and lensed fibers (www.ozoptics.com/ALL-NEW_PDF/DTS0080.pdf).

Figure 3E:
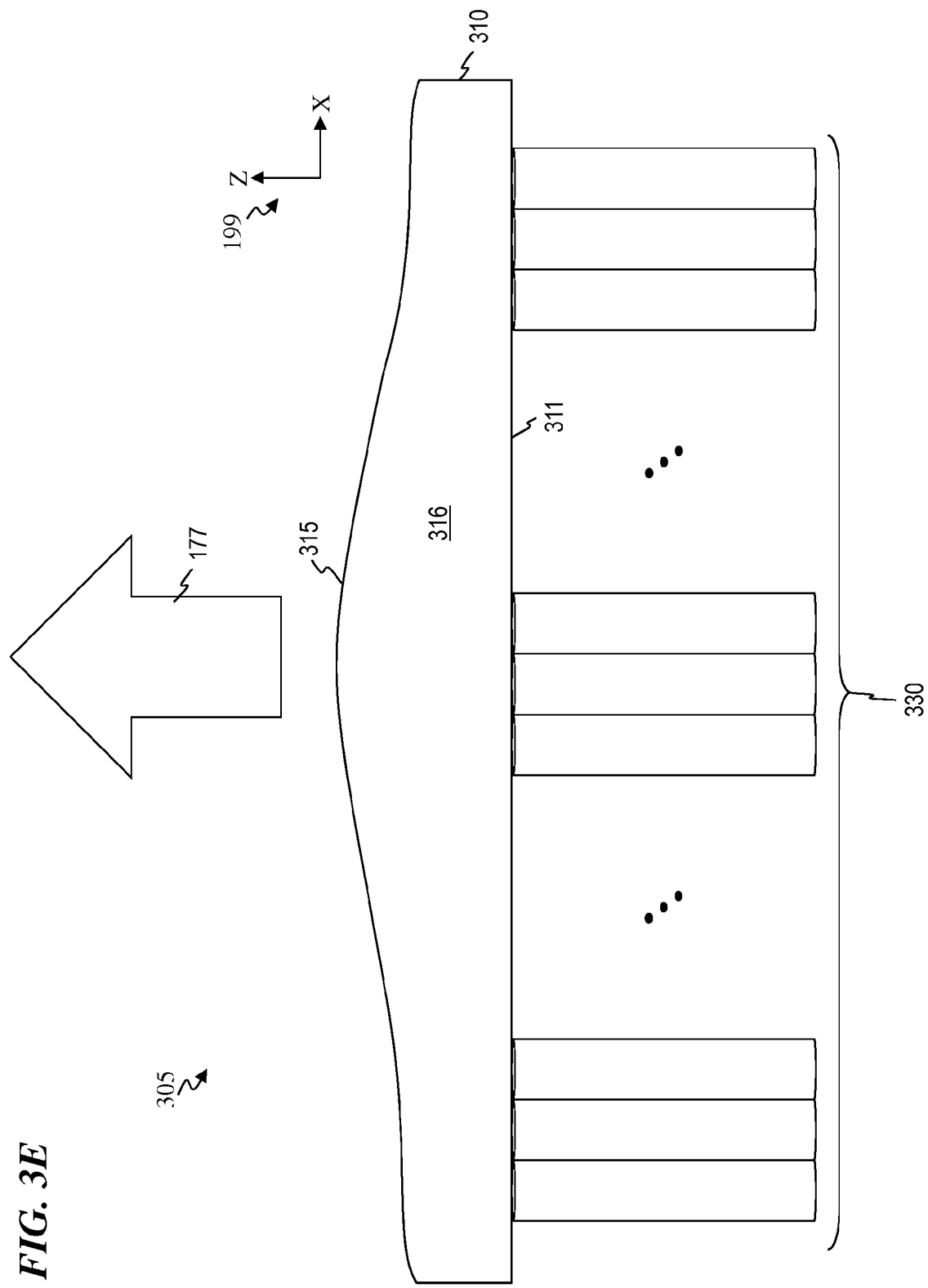
FIG. 3E is a schematic plan view of an optical-fiber-array assembly 305 that includes a curved second surface 315.

FIG. 3E is a schematic plan view of an optical-fiber-array assembly 305 that includes a curved second surface 315. In some embodiments, optical-fiber-array assembly 305 is substantially similar to optical-fiber-array assembly 301 of FIG. 3A except that optical-fiber-array assembly 305 includes the curved second surface 315 instead of flat second surface 312.

FIG. 4A is a schematic side view of an optical-fiber-array assembly 401. In some embodiments, optical-fiber-array assembly 401 includes a base plate 410 and a plurality of optical fibers 430 that are attached to a first surface 411 of base plate 410. In some embodiments, fibers 430 are glued to first surface 411. In some embodiments, fibers 430 are fused to first surface 411. In some embodiments, fibers 430 are attached to first surface 411 by laser welding, butt welding, soldering, or the like. In some embodiments, optical signals transmitted through the plurality of optical fibers 430 are transmitted into base plate 410 at first surface 411, transmitted through base plate 410, and then emitted as a composite output beam (which, in some embodiments, includes a plurality of output beams) from base plate 410 at a flat second surface 412 of base plate 410.

FIG. 4B is a schematic side view of an optical-fiber-array assembly 402. In some embodiments, optical-fiber-array assembly 402 is substantially similar to optical-fiber-array assembly 401 of FIG. 4A except that optical-fiber-array assembly 402 includes a fiber-array support 460 configured to support the plurality of fibers 430 (and therefore assist the alignment of fibers 430) prior to (and in some embodiments, after) affixing the plurality of optical fibers 430 to base plate 410. In some embodiments, fiber-array support 460 is made from the same material as base plate 410 (in some embodiments, for example, fiber-array support 460 is made from fused silica glass). In some embodiments, fiber-array support 460 includes a V-groove structure such as described by U.S. Pat. No. 7,058,275 to Sezerman et al. and U.S. Pat. No. 6,402,390 to Anderson et al. (see Background of Invention section of the present application). In some embodiments, support 460 further includes (or is affixed to) a plurality of heatsink fins 490 and/or an active cooling unit (such as a water-cooled heatsink, wherein the water is carried by a pipe or conduit to a cooling location remote from the base plate 410, in order to remove heat caused by partial absorption of the light passing through the device) attached to or placed against at least one face of the transparent base plate 410, and in some embodiments, a second heatsink or active cooling unit 491 is attached to or placed against the opposite faces as well (as shown by the dashed arrow in FIG. 4B).

FIG. 4C1 is a schematic side view of an optical-fiber-array assembly 403.1 that includes a curved second surface 413.1. In some embodiments, optical-fiber-array assembly 403.1 is substantially similar to optical-fiber-array assembly 401 of FIG. 4A except that optical-fiber-array assembly 403.1 includes the curved second surface 413.1 instead of flat second surface 412. In some embodiments, curved second surface 413.1 has a curvature that is substantially similar to curved second surface 113.1 of FIG. 1B1 and curved second surface 313.1 of FIG. 3B1 (i.e., in some embodiments, curved second surface 413.1 functions as a positive cylindrical lens). FIG. 4C2 is a schematic side view of an optical-fiber-array assembly 403.2 that includes a curved second surface 413.2. In some embodiments, curved second surface 413.2 has a curvature that is substantially similar to curved second surface 113.2 of FIG. 1B2 and curved second surface 313.2 of FIG. 3B2 (i.e., in some embodiments, curved second surface 413.2 functions as a positive spherical lens).

Figure 4D:
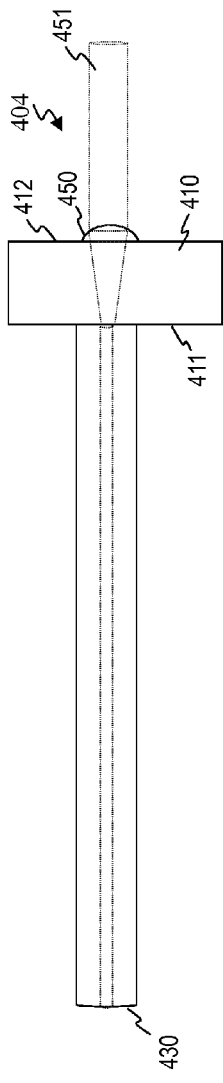
FIG. 4D is a schematic side view of an optical-fiber-array assembly 404.

FIG. 4D is a schematic side view of an optical-fiber-array assembly 404. In some embodiments, optical-fiber-array assembly 404 is substantially similar to optical-fiber-array assembly 401 of FIG. 4A except that optical-fiber-array assembly 404 includes a plurality of lenslets (or other beam-shaping/diffractive optics) 450 configured to shape (e.g., focus, collimate, diverge, or the like) individual output beams of the composite output beam of optical-fiber-array assembly 404. For example, in some embodiments, individual optical signals are transmitted through optical-fiber-array assembly 404 in pattern 451 such that the plurality of output beams associated with the individual optical signals are emitted as collimated beams from optical-fiber-array assembly 404.

Figure 4E:
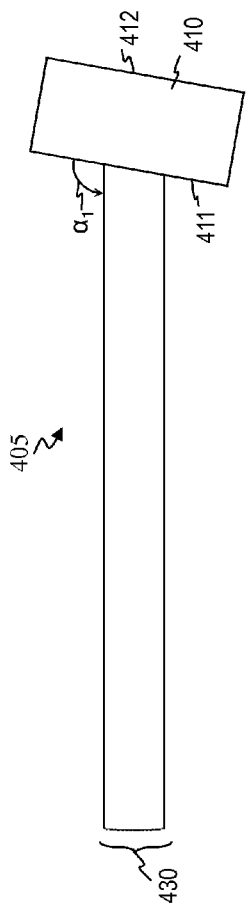
FIG. 4E is a schematic side view of an optical-fiber-array assembly 405.

FIG. 4E is a schematic side view of an optical-fiber-array assembly 405. In some embodiments, assembly 405 is substantially similar to assembly 401 of FIG. 4A except that the plurality of optical fibers 430 of assembly 405 attach to first surface 411 at a first angle $\alpha_1$ that is other than perpendicular, in order that any reflections from the fiber-core to base plate boundary do not get coupled in a backward-propagating direction in the core but rather leak out the sides of the fiber.

Figure 4F:
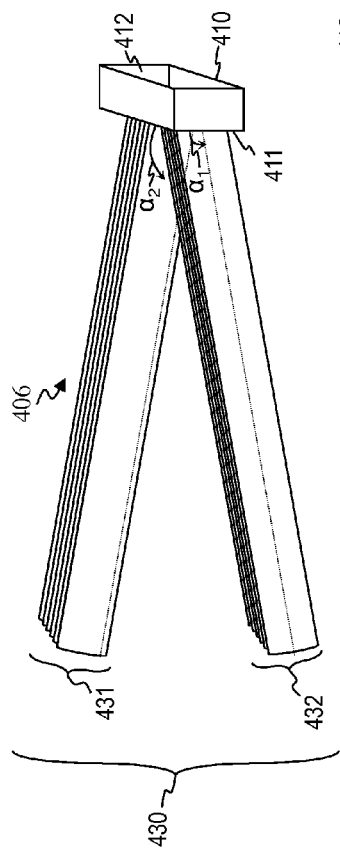
FIG. 4F is a schematic perspective view of an optical-fiber-array assembly 406.

FIG. 4F is a schematic perspective view of an optical-fiber-array assembly 406. In some embodiments, assembly 406 is substantially similar to assembly 405 of FIG. 4E except that the plurality of optical fibers 430 includes a first subset of optical fibers 431 that attach to first surface 411 at a first angle $\alpha_1$ that is other than perpendicular, and a second subset of optical fibers 432 that attach to first surface 411 at a second angle $\alpha_2$ that is different than the first angle. The varying attachment angles of the fibers substantially reduces the reflections from the fiber-core to base plate boundary that get coupled in a backward-propagating direction in the core (and, in some embodiments, the varying attachment angles of the fibers cause the reflections to leak out the sides of the fibers). In some embodiments, the plurality of optical fibers 430 are attached to first surface 411 of base plate 410 in any other suitable configuration.

Figure 4G:
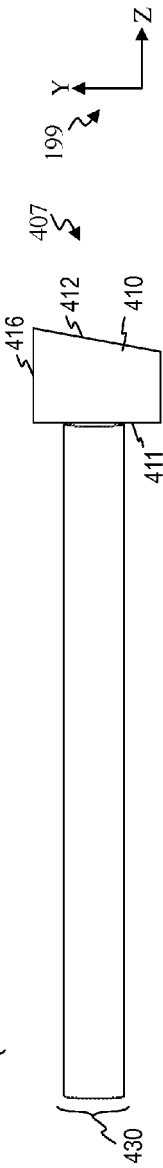
FIG. 4G is a schematic side view of an optical-fiber-array assembly 407.

FIG. 4G is a schematic side view of an optical-fiber-array assembly 407. In some embodiments, assembly 407 is substantially similar to assembly 401 of FIG. 4A except that first surface 411 and second surface 412 are not parallel with each other in the Y-Z plane (the generally Y direction) (e.g., in assembly 407 of FIG. 4G, second surface 412 is formed at an angle that is not perpendicular with top surface 416 of base plate 410, and first surface 411 forms a perpendicular angle with top surface 416 of base plate 410). Forming second surface 412 such that it is non-perpendicular with top surface 416 substantially reduces the reflections at second surface 412 that couple in a backward-propagating direction toward first surface 411 and into the core. Similarly, forming first surface 411 such that it is non-perpendicular with top surface 416 substantially reduces the reflections from the fiber-core to base plate boundary that get coupled in a backward-propagating direction in the core.

FIG. 5A1 is a schematic plan view of a spectral beam combiner 500.1 that includes an optical-fiber-array assembly 501. In some embodiments, optical-fiber-array assembly 501 includes one of the optical-fiber-array assemblies discussed in the present application (e.g., optical-fiber-array assembly 101.1, 101.2, 102.1, 102.2, 103.1, 103.2, 104, 201, 202, 203, 204, 205, 206, 207, 301, 302.1, 302.2, 3030, 3031, 304, 401, 402, 403.1, 403.2, 404, 405, 406, 601, 602, or 603). In some embodiments, the composite output beam emitted from optical-fiber-array assembly 501 includes a plurality of output beams that serve as input beams 96, 97, 98, . . . 99 for grating $G_1$ 551 (in some such embodiments, the plurality of output beams pass through a plurality of collimating focusing elements (e.g., a lens array) after leaving optical-fiber-array assembly 501 and before contacting grating $G_1$ 551). In some embodiments, input beam 96 has wavelength $\lambda_1$, input beam 97 has wavelength $\lambda_2$, input beam 98 has wavelength $\lambda_3$, and input beam 99 has wavelength $\lambda_N$. In some embodiments, spectral beam combiner 500 includes wavelength-dispersion compensation using a plurality of gratings (e.g., 551 and 552). In some embodiments, each grating is made using conventional methods for making single gratings, for example, such as described in U.S. Pat. No. 5,907,436 to Perry et al., U.S. Pat. No. 7,199,924 to Brown et al., U.S. Pat. No. 3,728,117 to Heidenhain et al., U.S. Pat. No. 4,895,790 to Swanson et al., U.S. Pat. No. 6,822,796 to Takada et al., and/or U.S. Pat. No. 6,958,859 to Hoose et al. (each of which are incorporated herein by reference). In some embodiments, asymmetric grooves in gratings $G_1$ 551 and $G_2$ 552 are dielectric coated, and have a groove profile and periodicity spacing selected to maximize the efficiency of diffracting the most power into a single-order mode (i.e., the order that goes in the direction of the second grating) and to minimize the power absorbed by the gratings, in order to minimize heat distortion of the grating and to maximize output power and intensity. In some embodiments, every input beam 96, 97, 98, . . . 99 impinges into the first grating $G_1$ 551 at the same angle, but each intermediate beam leaves the first grating $G_1$ 551 at a different angle that depends on the wavelength of that beam, and each intermediate beam converges to a single spot and impinges on the second grating 552 (the surface of which is parallel to the first grating 551 ($G_1$)) using the same respective angles as the outgoing angles for that wavelength from the first grating 551 ($G_1$), and every beam leaves the second grating at the same outgoing angle in a single combined beam 90 that is parallel to the input beams and in the same direction. In some embodiments, the input grating 551 introduces a compensating dispersion in a direction that is opposite that of output grating 552, such that the output beam 90 is substantially collimated and there is minimal or no chromatic dispersion due to the spreading of linewidths that occurs when using only a single grating.

FIG. 5A2 is a schematic plan view of a spectral beam combiner 500.2 that includes an optical-fiber-array assembly 501. In some embodiments, optical-fiber-array assembly 501 includes one of the optical-fiber-array assemblies discussed in the present application (e.g., optical-fiber-array assembly 101.1, 101.2, 102.1, 102.2, 103.1, 103.2, 104, 201, 202, 203, 204, 205, 206, 207, 301, 302.1, 302.2, 3030, 3031, 304, 401, 402, 403.1, 403.2, 404, 405, 406, 601, 602, or 603). In some embodiments, the composite output beam emitted from optical-fiber-array assembly 501 includes a plurality of output beams that serve as input beams 96, 97, 98, . . . 99 for parabolic-section mirror $M_1$ 555 (in some embodiments, the mirror is a dielectric-coated mirror having a plurality of layers of dielectric to enhance reflectivity, and is a section of a parabolic shape that directs and/or focuses all of the input beams 96, 97, . . . 98, 99 to a single location on the output grating 552. In some such embodiments, the plurality of output beams pass through a plurality of collimating focusing elements (e.g., a lens array) after leaving optical-fiber-array assembly 501 and before contacting mirror $M_1$ 555, such that each beam is collimated (having parallel rays). In some embodiments, the mirror $M_1$ 555 is a parabola in the X-Z plane, but the intersection of the mirror surface with planes of constant Z form straight lines, and thus the collimated input beams 96-99 get focussed in the X-Z direction but keep their collimated width in the Y direction, and in some embodiments, the input beams 96-99 are collimated such that their cross-section is wider in the X direction than in the Y direction before they reflect from the mirror $M_1$ 555, in order that the output beam 90 has a substantially circular shape with a substantially Gaussian intensity cross section. In some embodiments, input beam 96 has wavelength $\lambda_1$, input beam 97 has wavelength $\lambda_2$, input beam 98 has wavelength $\lambda_3$, and input beam 99 has wavelength $\lambda_N$. In some embodiments, spectral beam combiner 500.2 includes wavelength-dispersion compensation using mirror $M_1$ 555 and grating 552. In some embodiments, grating $G_2$ 552 is as described in FIG. 5A1 above. In some embodiments, every input beam 96, 97, 98, . . . 99 is parallel and thus impinges into the mirror $M_1$ 555 at the same angle, but each intermediate beam leaves the mirror $M_1$ 555 at a different angle that depends on the position (and thus the wavelength) of that beam, and each intermediate beam converges to a single spot, and every beam leaves the grating $G_2$ 552 at the same outgoing angle in a single coaxial combined beam 90 that is parallel to the input beams and in the same direction. In other embodiments, mirror $M_1$ 555 and the input beams 96-99 are configured in any other suitable manner (not shown here) such that the intermediate beams 95 converge to a single location on output grating 552 as shown in FIG. 5A2, and such that the output beam 90 is substantially collimated (except for slight chromatic dispersion of the linewidths of each laser beam that remains because the mirror $M_1$ 555 does not provide the pre-compensating opposite chromatic dispersion obtained by the input grating $G_1$ 551 of the more complex system 500.1 of FIG. 5A1).

FIG. 5A3 is a schematic perspective view of a spectral beam combiner 500.2 that includes an optical-fiber-array assembly 501. The description of FIG. 5A2 applies here. In addition, in this FIG. 5A3, the input fibers 530 for the optical-fiber-array assembly 501 are shown. Also, an exit window or port 509 is provided for the zero-order beam coming off grating 552, which is then directed to a beam dump (not shown) to absorb the unwanted light, or is directed to some other use.

Figure 5B:
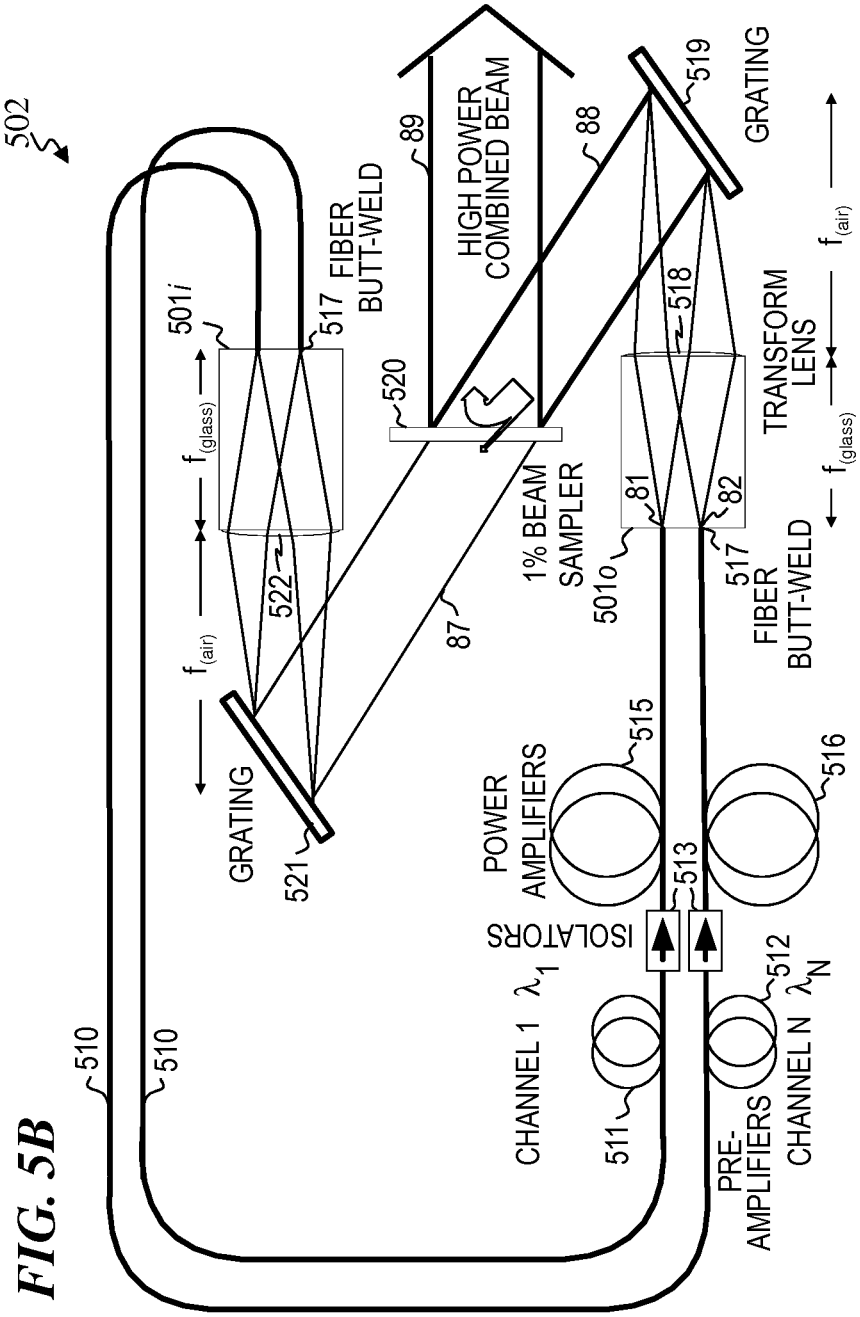
FIG. 5B is a schematic diagram of a spectral-beam-combining ring-laser system 502 that uses in-line isolators to help ensure unidirectional travel of the lasing beams around the rings.

FIG. 5B is a schematic diagram of a ring SBC system 502. In some embodiments, system 502 includes a plurality of optical fibers 510 (the two shown, plus optionally one or more others located at spaced-apart positions between those shown) coupled (e.g., in some embodiments, welded to optical-fiber array assembly 501i or 501o at butt-weld joint 517) to input optical-fiber-array assembly 501i to receive chromatically dispersed optical feedback from grating 521 and focusing element 522 (e.g., a lens or mirror). The optical signals in fibers 510 are each amplified by their respective preamplifier 511-512, and respective power amplifier 515-516. In some embodiments, an optical isolator 513 is provided for each optical path between the respective preamplifiers 511-512, and respective power amplifiers 515-516. The output end of each fiber is attached to output optical-fiber-array assembly 501o (e.g., in some embodiments, each fiber is welded at butt-weld joint 517). In some embodiments, each fiber's output end has a beam-expanding endcap (as shown in FIG. 1B1, FIG. 1B2, FIG. 2G2, FIG. 3B1, FIG. 3B2, FIG. 3C2, FIG. 4C1, and FIG. 4C2) and/or a hollow-core fiber termination (as shown in FIG. 6A3 and FIG. 6A4), corresponding to those described in U.S. Pat. No. 7,391,561, filed May 26, 2006 and issued Jun. 24, 2008, titled FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD, which is incorporated herein by reference. The plurality of output beams 81-82 (plus optionally one or more others), each having a different wavelength, are each collimated by focusing element 518 (e.g., a lens as shown here, a plurality of lenslets as shown in FIG. 3C2, or a diffractive focussing optical element or mirror that perform the corresponding function) into their own respective angularly converging collimated beam that each impinge onto grating 519 at a different angle, and due to their respective different wavelengths, each is spectrally combined into a single beam 88. In some embodiments, a mostly reflective, but partially transmissive, output mirror 520 (also called a beam sampler 520) reflects most of beam 88 into output beam 89, which, due to the single output grating 519, has chromatic dispersion. In some embodiments, output mirror 520 reflects about 99% of beam 88 into output beam 89, and transmits about 1% as feedback beam 87, which is then diffracted by input grating 521 and focused by focusing element 522 (e.g., a lens as shown, or a diffractive focussing optical element or mirror that perform the corresponding function) such that each different wavelength is directed into its own respective optical fiber 510 held by input optical-fiber-array assembly 501i. In some embodiments, optical-fiber-array assembly 501i and/or 501o includes one of the optical-fiber-array assemblies discussed in the present application (e.g., optical-fiber-array assembly 102.1, 102.2, 201, 202, 203, 204, 205, 206, 207, 302.1, 302.2, 3031, 304, 403.1, 403.2, 404, 670B, 670C, or 603).

In the ring SBC system 502, the output from multiple-fiber channels is combined using a grating, just as in a single-grating MOPA system, but a portion of the combined beam is separated into the individual wavelengths using a second grating (in some embodiments, one that is identical to the first grating) and fed back to form the ring oscillator. The analysis of the beam quality of the combined beam is similar to the single grating MOPA system. Even though the linewidth requirement of the ring SBC is similar to the single-grating SBC system, the system complexity is significantly reduced in the ring SBC system because the wavelength and linewidth of the individual fiber lasers are automatically set by the system. This is particularly advantageous for a system with a large number of channels.

FIG. 6A1 is a schematic perspective view of an optical-fiber-array assembly 601. In some embodiments, optical-fiber-array assembly 601 includes a base plate 610 and a plurality of optical fibers 630 (e.g., in some embodiments, optical fiber 630.1 through 630.N) that are attached to a first surface 611 of base plate 610. In some embodiments, base plate 610 includes a top major face 616. In some embodiments, optical signals transmitted through the plurality of optical fibers 630 are transmitted into base plate 610 at first surface 611, transmitted through base plate 610, and then emitted as a composite output beam 177 from base plate 610 at a second surface 612 of base plate 610. In some embodiments, base plate 610 includes a hollow plate 660 having an interior space (in some embodiments, the interior space of hollow plate 660 is air-filled or has a vacuum). Hollow plate 660 allows the optical signals transmitted through the plurality of optical fibers to expand within base plate 610 without having to go through as much material (e.g., glass), which therefore leads to less power absorption. In some embodiments, the plurality of optical fibers 630 include a plurality of hollow-core photonic-bandgap fibers, and in some such embodiments, the plurality of hollow-core fibers 630 are butt-welded to a corresponding plurality of capillary holes 631 (e.g., in some embodiments, capillary holes 631.1 through 631.N) at first surface 611 such that the center of an individual fiber 630 lines up with the center of a corresponding capillary hole 631. In some embodiments, capillary holes 631 connect directly to hollow plate 660 such that optical signals transmitted through the plurality of optical fibers 630 are transmitted through capillary holes 631 and into hollow plate 660.

FIG. 6A2 is a schematic cross-section view (across plane 670 of FIG. 6A1) of assembly 601 that includes an output window 661 at second surface 612 according to some embodiments of the invention. In some embodiments, base plate 610 is made from glass and is laser-welded (joint 640) at one end to the output end of optical fiber 630 (e.g., in some embodiments, a hollow-core photonic-bandgap fiber) and at the other end to output window 661, in order to seal out contaminants from the PCF holes and hollow core of fiber 630. In some embodiments, optical fiber 630 includes a solid core. In some embodiments, output window 661 is angled and anti-reflection coated at its inner and/or outer surfaces, in order to reduce detrimental reflections. In some embodiments, the length of base plate 610 is sufficient such that the length of hollow plate 660 allows some spreading of the output-signal beam, in order to reduce the power density as the beam encounters window 661 and thus reduce optical damage to window 661 and window surfaces 662 at high beam powers.

FIG. 6A3 is a schematic cross-section view (across plane 670 of FIG. 6A1) of assembly 601 that includes an output lenslet 664 for each of a plurality of output beams at second surface 612 according to some embodiments of the invention. In some embodiments, base plate 610 is made from glass and is laser-welded (joint 640) at one end to the output end of optical fiber 630 (e.g., in some embodiments, a hollow-core photonic-bandgap fiber) and at the other end to output lenslets 664, in order to seal out contaminants from the PCF holes and hollow core of fiber 630. In some embodiments, output lenslets 664 have anti-reflection coatings at their inner and/or outer surfaces, in order to reduce detrimental reflections. In some embodiments, the length of base plate 610 is sufficient such that the length of hollow plate 660 allows output lenslets 664 to focus the output-signal beam.

FIG. 6A4 is a schematic cross-section view (across plane 670 of FIG. 6A1) of an assembly 601 that includes an output meniscus (concave-convex) lenslet 665 for each of a plurality of output beams at second surface 612 according to some embodiments of the invention. In some embodiments, base plate 610 is made from glass and is laser-welded (joint 640) at one end to the output end of optical fiber 630 (e.g., in some embodiments, a hollow-core photonic-bandgap fiber) and at the other end to output lenslets 665, in order to seal out contaminants from the PCF holes and hollow core of fiber 630. In some embodiments, output lenslets 665 have anti-reflection coatings at their inner and/or outer surfaces, in order to reduce detrimental reflections. In some embodiments, the length of base plate 610 is sufficient such that the length of hollow plate 660 allows output lenslets 665 to focus the output-signal beam.

In some embodiments, the composite output beam 177 includes a plurality of output beams, wherein the shape of the plurality of output beams (i.e., whether the beams are focused, collimated, diverged, polarized, interfering or the like) is based on the geometries of the plurality of optical fibers 630 and on the geometry of base plate 610 and the characteristics of the optical signals supplied by the optical fibers 630. In some embodiments, the composite output light pattern (also called composite "beam") 177 (e.g., in some embodiments, a plurality of output beams) include a plurality of wavelengths (in some such embodiments, each one of the plurality of output beams has a unique wavelength).

Figure 6B:
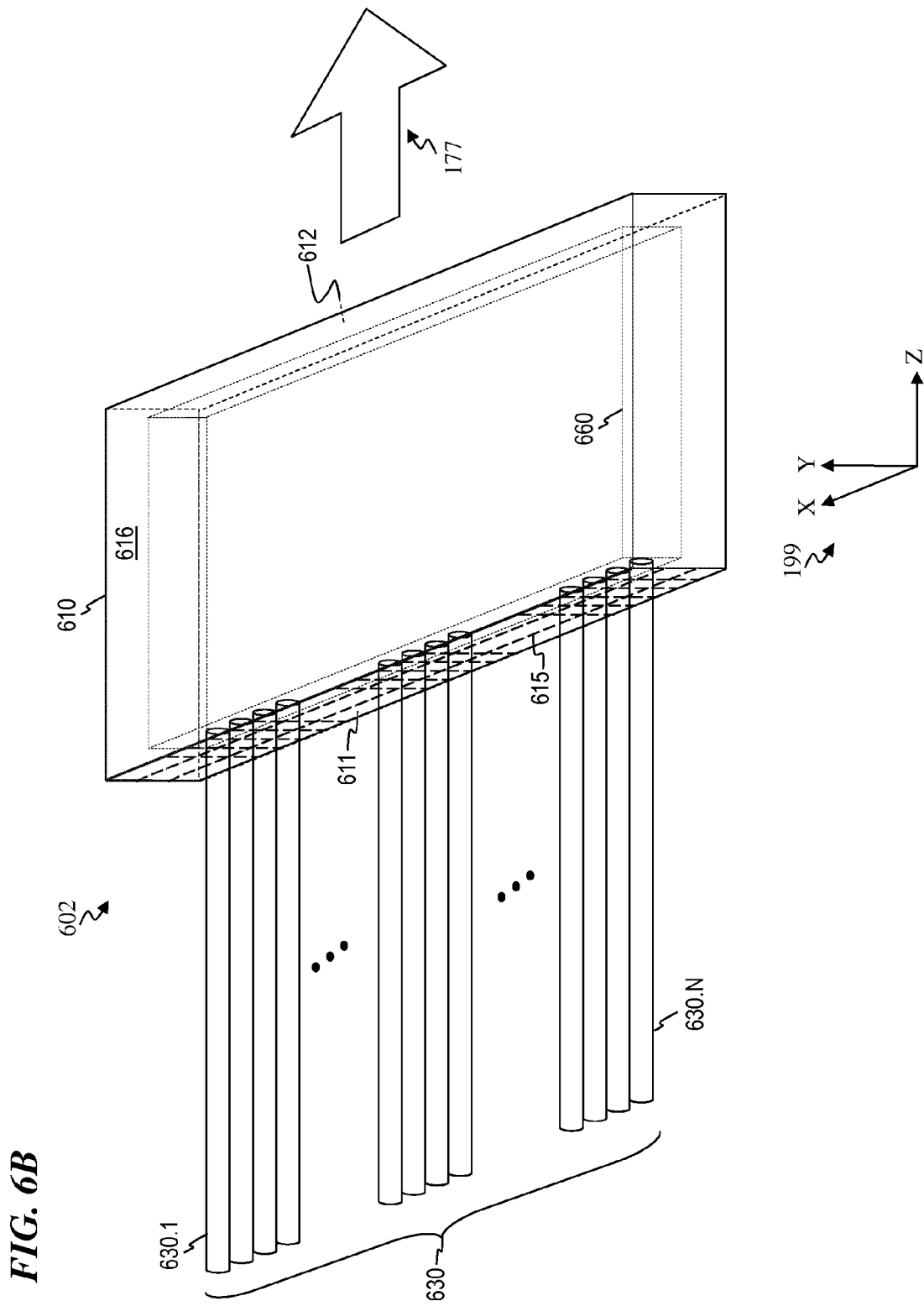
FIG. 6B is a schematic perspective view of an optical-fiber-array assembly 602.

FIG. 6B is a schematic perspective view of an optical-fiber-array assembly 602. In some embodiments, assembly 602 is substantially similar to assembly 601 of FIG. 6A except that the plurality of optical fibers 630 in assembly 602 connect directly to the surface of hollow plate 660 as opposed to connecting to surface 611 of base plate 610. The configuration of assembly 602 eliminates even more material that would have to be traveled through by the optical signals expanding within base plate 610.

Figure 6C:
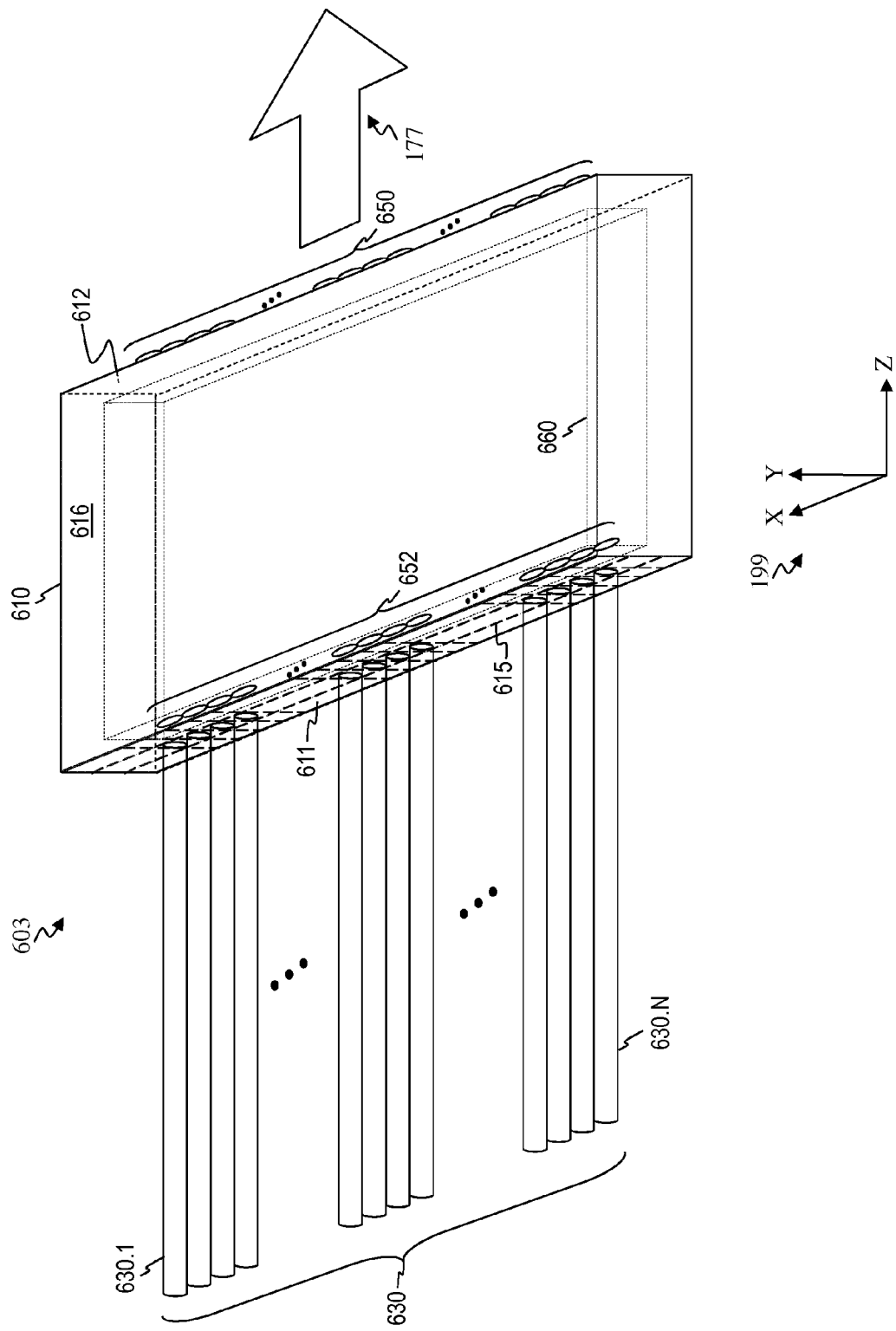
FIG. 6C is a schematic perspective view of an optical-fiber-array assembly 603.

FIG. 6C is a schematic perspective view of an optical-fiber-array assembly 603. In some embodiments, assembly 603 is substantially similar to assembly 601 of FIG. 6A except that base plate 610 further includes a plurality of beam-shaping devices (e.g., in some embodiments, a plurality of lenslets) 650 configured to shape (focus, collimate, diverge, or the like) individual output beams of the composite output beam 177 of optical-fiber-array assembly 603. In some embodiments, assembly 603 further includes a plurality of beam-shaping devices 652 at the input end of hollow plate 660 configured to shape the plurality of optical signals entering hollow plate 660 from optical fibers 630.

FIG. 6D is a schematic plan view of optical-fiber-array assembly 603 of FIG. 6C. In some embodiments, individual optical signals are transmitted through optical-fiber-array assembly 603 such that the plurality of output beams associated with the individual optical signals are emitted as collimated output beams 651 from optical-fiber-array assembly 603.

In some embodiments, the present invention provides an apparatus that includes a plurality of optical fibers including a first optical fiber and a second optical fiber, wherein the first optical fiber is configured to transmit a first optical signal, and wherein the second optical fiber is configured to transmit a second optical signal; and a fiber-array plate configured to receive the plurality of optical signals from the plurality of optical fibers and emit a composite output beam, wherein the fiber-array plate includes a first surface and a second surface, wherein the plurality of optical fibers are configured to connect to the first surface of the fiber-array plate. In some embodiments, the composite output beam includes a plurality of output beams.

In some embodiments, the second surface of the fiber-array plate includes a plurality of beam-shaping optics configured to shape the composite output beam. In some embodiments, the beam-shaping optics include a plurality of lenslets.

In some embodiments, the apparatus further includes a support structure configured to support the plurality of optical fibers connected to the first side of the fiber-array plate. In some embodiments, the support structure is made from a material that includes glass.

In some embodiments, the second side of the fiber-array plate includes a convex curvature. In some embodiments, the second side of the fiber-array plate includes a concave curvature.

In some embodiments, at least some of the optical fibers are butt welded to the first surface of the fiber-array plate. In some embodiments, at least some of the optical fibers are glued to the first surface of the fiber-array plate. In some embodiments, at least some of the optical fibers are fused to the first surface of the fiber-array plate.

In some embodiments, the first surface of the fiber-array plate includes indicia configured to assist in the alignment of the plurality of optical fibers on the first surface of the fiber-array plate. In some embodiments, the indicia include fiber-positioning lines. In some embodiments, the fiber-positioning lines are configured to assist in aligning polarization-maintaining axes of the plurality of optical fibers. In some embodiments, each one of the plurality of optical fibers are shaped such that the polarization-maintaining axes of each one of the plurality of optical fibers is aligned with the fiber-positioning lines on the first surface of the fiber-array plate. In some embodiments, the plurality of optical fibers is connected to the first surface such that the first optical fiber is substantially parallel to the second optical fiber. In some embodiments, the plurality of optical fibers is connected to the first surface such that the first optical fiber is adjacent and substantially parallel to the second optical fiber.

In some embodiments, the fiber-array plate is made from a material that includes monolithic fused silica.

In some embodiments, the present invention provides a method that includes providing a plurality of optical fibers including a first optical fiber and a second optical fiber; providing a fiber-array plate, wherein the fiber-array plate includes a first surface and a second surface; connecting the plurality of optical fibers to the first surface of the fiber-array plate; transmitting a plurality of optical signals through the plurality of optical fibers and into the fiber-array plate at the first surface of the fiber-array plate; and emitting a composite output beam from the second surface of the fiber-array plate. In some embodiments, the emitting of the composite output beam includes emitting a plurality of output beams.

In some embodiments, the connecting of the plurality of optical fibers includes butt welding the plurality of optical fibers to the first surface of the fiber-array plate. In some embodiments, the connecting of the plurality of optical fibers includes gluing the plurality of optical fibers to the first surface of the fiber-array plate.

In some embodiments, the emitting of the composite output beam includes shaping the output beam. In some embodiments, the providing of the fiber-array plate includes providing a convex second surface of the fiber-array plate, wherein the shaping of the composite output beam includes transmitting the plurality of optical signals through the convex second surface. In some embodiments, the providing of the fiber-array plate includes providing a concave second surface of the fiber-array plate, wherein the shaping of the composite output beam includes transmitting the plurality of optical signals through the concave second surface. In some embodiments, the providing of the fiber-array plate includes providing a plurality of lenslets on the second surface of the fiber-array plate, wherein the shaping of the composite output beam includes transmitting the plurality of optical signals through the plurality of lenslets.

In some embodiments, the method further includes providing a support structure; and supporting the plurality of optical fibers using the support structure during the connecting of the plurality of optical fibers to the first surface of the fiber-array plate.

In some embodiments, the providing of the fiber-array includes providing indicia on the first surface to assist alignment of the plurality of optical fibers during the connecting of the plurality of optical fibers to the first surface.

In some embodiments, an optical-fiber array assembly (OFAA) is used at the output ends of a plurality of fibers, wherein light is emitted from the output ends of the fibers and exits an opposite face of the array assembly. In some other embodiments, an optical-fiber array assembly is used at the input ends of a plurality of fibers, wherein light enters a face of the optical-fiber array assembly and a portion of that light then exits the optical-fiber array assembly into the input ends of the fibers. In some embodiments, one optical-fiber array assembly is used at each of two ends of a plurality of fibers, wherein at one OFAA light is emitted from the output ends of the fibers and exits an opposite face of the OFAA; another optical-fiber array assembly is used at the input ends of a plurality of fibers, wherein light enters a face of the second optical-fiber array assembly and a portion of that light then exits the optical-fiber array assembly into the input ends of the fibers. In some such embodiments, a ring laser is thus implemented (such as shown in FIG. 5B or in the numerous embodiments shown in U.S. patent application Ser. No. 12/291,031 titled "SPECTRAL-BEAM COMBINING FOR HIGH-POWER FIBER-RING-LASER SYSTEMS" filed Feb. 17, 2009 by Eric C. Honea et al., which issued as U.S. Pat. No. 8,526,110 on Sep. 3, 2013, and which is incorporated herein by reference).

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). It also is specifically contemplated that some embodiments of the invention include supersets and/or subsets of the embodiments and combinations described herein combined with one or more embodiments of the related applications recited herein, including U.S. Pat. Nos. 7,539,231, 7,471,705, 7,391,561, 7,671,337, and 7,199,924, U.S. patent application Ser. Nos. 11/565,619 (now U.S. Pat. No. 7,768,700), 11/688,854 (now U.S. Pat. No. 7,835,608), 12/018,193 (now U.S. Pat. No. 7,872,794), 12/624,327 (now U.S. Pat. No. 8,441,718), 12/793,508 (now U.S. Pat. No. 8,355,608), and U.S. Provisional Patent Application Nos. 61/263,736, 61/343,948, and 61/343,945 or any of the other patents, patent applications, and provisional patent applications listed herein, which are all hereby incorporated herein by reference. Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
a first plurality of polarization-maintaining optical fibers configured to transmit a plurality of polarized optical signals, wherein the first plurality of polarization-maintaining optical fibers includes a first optical fiber configured to transmit a first polarized optical signal and a second optical fiber configured to transmit a second polarized optical signal; and
a fiber-array plate configured to receive the first plurality of polarized optical signals from the plurality of polarization-maintaining optical fibers and emit a composite output beam that includes the first polarized optical signal and the second polarized optical signal, wherein the fiber-array plate includes a first surface and a second optical-signal-output surface, wherein the first plurality of polarization-maintaining optical fibers is fused to the first surface of the fiber-array plate, wherein the fiber-array plate includes a hollow inner chamber between the first surface and the second surface, and wherein the hollow inner chamber is air filled.

2. The apparatus of claim 1, wherein the first optical fiber has a first polarization-maintaining axis, wherein the second optical fiber has a second polarization-maintaining axis, and wherein the first plurality of polarization-maintaining optical fibers is fused to the first surface of the fiber-array plate such that the first and second polarization-maintaining axes are both parallel to a first plane.

3. The apparatus of claim 1, wherein each one of the first plurality of polarization-maintaining optical fibers has a cross-section that includes a non-circular outer circumference.

4. The apparatus of claim 1, wherein the first surface of the fiber-array plate includes indicia configured to assist in the alignment of the first plurality of polarization-maintaining optical fibers on the first surface of the fiber-array plate.

5. The apparatus of claim 1, wherein the first plurality of polarization-maintaining optical fibers is fused to the first surface in a first row, the apparatus further comprising a second plurality of polarization-maintaining optical fibers connected to the first surface in a second row, wherein the first row is parallel to the second row.

6. The apparatus of claim 1, wherein the first plurality of polarization-maintaining optical fibers is fused to the first surface in a first row, the apparatus further comprising a second plurality of polarization-maintaining optical fibers connected to the first surface in a second row, wherein the first row is parallel to the second row, and wherein the second row is in an off-set configuration compared to the first row.

7. An apparatus comprising:
a first plurality of polarization-maintaining optical fibers configured to transmit a plurality of polarized optical signals, wherein the first plurality of polarization-maintaining optical fibers includes a first optical fiber configured to transmit a first polarized optical signal and a second optical fiber configured to transmit a second polarized optical signal; and
a fiber-array plate configured to receive the first plurality of polarized optical signals from the plurality of polarization-maintaining optical fibers and emit a composite output beam that includes the first polarized optical signal and the second polarized optical signal, wherein the fiber-array plate includes a first surface and a second optical-signal-output surface, wherein the first plurality of polarization-maintaining optical fibers is fused to the first surface of the fiber-array plate,
wherein the first plurality of polarization-maintaining optical fibers is fused to the first surface in a first row, the apparatus further comprising a second plurality of polarization-maintaining optical fibers connected to the first surface in a second row, wherein the first row is parallel to the second row, wherein each one of the first plurality of polarization-maintaining fibers in the first row has a first polarization-maintaining axis, wherein each one of the second plurality of polarization-maintaining fibers in the second row has a second polarization-maintaining axis, and wherein the first polarization-maintaining axis is perpendicular to the second polarization-maintaining axis.

8. The apparatus of claim 7, wherein the first surface of the fiber-array plate includes indicia configured to assist in the alignment of the first plurality of polarization-maintaining optical fibers on the first surface of the fiber-array plate.

9. The apparatus of claim 7, wherein the fiber-array plate includes a polarization combiner configured to combine a first polarization associated with the first polarization-maintaining axis with a second polarization associated with the second polarization-maintaining axis such that the composite output beam is unpolarized.

10. A method comprising:
providing a first plurality of polarization-maintaining optical fibers including a first optical fiber and a second optical fiber;
providing a fiber-array plate, wherein the fiber-array plate includes a first surface and a second optical-signal-output surface, and wherein the fiber-array plate includes an air-filled hollow inner chamber between the first surface and the second surface;
fusing the first plurality of polarization-maintaining optical fibers to the first surface of the fiber-array plate;
transmitting a plurality of optical signals through the first plurality of polarization-maintaining optical fibers and into the fiber-array plate at the first surface of the fiber-array plate, wherein the plurality of optical signals includes a first polarized optical signal transmitted through the first optical fiber and a second polarized optical signal transmitted through the second optical fiber; and
emitting a composite output beam that includes the first polarized optical signal and the second polarized optical signal from the second optical-signal-output surface of the fiber-array plate, wherein the emitting of the composite output beam includes shaping the composite output beam.

11. The method of claim 10, wherein the first optical fiber has a first polarization-maintaining axis, wherein the second optical fiber has a second polarization-maintaining axis, and wherein the fusing includes aligning the first plurality of polarization-maintaining fibers such that the first and second polarization-maintaining axes are both parallel to a first plane.

12. The method of claim 10, wherein each one of the first plurality of polarization-maintaining optical fibers has a cross-section that includes a non-circular outer circumference.

13. The method of claim 10, wherein the providing of the fiber-array plate includes providing a plurality of lenslets on the second surface of the fiber-array plate, and wherein the shaping of the composite output beam includes transmitting the plurality of optical signals through the plurality of lenslets.

14. The method of claim 10, wherein the fusing of the first plurality of polarization-maintaining optical fibers includes aligning the first plurality of polarization-maintaining optical fibers in a first row, the method further comprising:
providing a second plurality of polarization-maintaining optical fibers; and
connecting the second plurality of polarization-maintaining optical fibers to the first surface, wherein the connecting of the second plurality of polarization-maintaining optical fibers includes aligning the second plurality of polarization-maintaining optical fibers in a second row, wherein the first row is parallel to the second row.

15. The method of claim 10, wherein the providing of the fiber-array includes providing indicia on the first surface to assist alignment of the first plurality of polarization-maintaining optical fibers during the fusing of the first plurality of polarization-maintaining optical fibers to the first surface.

16. A method comprising:
- providing a first plurality of polarization-maintaining optical fibers including a first optical fiber and a second optical fiber;
- providing a fiber-array plate, wherein the fiber-array plate includes a first surface and a second optical-signal-output surface, and wherein the fiber-array plate includes an air-filled hollow inner chamber between the first surface and the second surface;
- fusing the first plurality of polarization-maintaining optical fibers to the first surface of the fiber-array plate;
- transmitting a plurality of optical signals through the first plurality of polarization-maintaining optical fibers and into the fiber-array plate at the first surface of the fiber-array plate, wherein the plurality of optical signals includes a first polarized optical signal transmitted through the first optical fiber and a second polarized optical signal transmitted through the second optical fiber; and
- emitting a composite output beam that includes the first polarized optical signal and the second polarized optical signal from the second optical-signal-output surface of the fiber-array plate.

17. The method of claim 16, wherein the fusing of the first plurality of polarization-maintaining optical fibers includes aligning the first plurality of polarization-maintaining optical fibers in a first row, the method further comprising:
- providing a second plurality of polarization-maintaining optical fibers; and
- connecting the second plurality of polarization-maintaining optical fibers to the first surface, wherein the connecting of the second plurality of polarization-maintaining optical fibers includes aligning the second plurality of polarization-maintaining optical fibers in a second row, wherein the first row is parallel to the second row.

18. The method of claim 16, wherein the fusing of the first plurality of polarization-maintaining optical fibers includes aligning the first plurality of polarization-maintaining optical fibers in a first row, the method further comprising:
- providing a second plurality of polarization-maintaining optical fibers; and
- connecting the second plurality of polarization-maintaining optical fibers to the first surface, wherein the connecting of the second plurality of polarization-maintaining optical fibers includes aligning the second plurality of polarization-maintaining optical fibers in a second row, wherein the first row is parallel to the second row, and wherein the second row is in an off-set configuration compared to the first row.

19. The method of claim 16, wherein the providing of the fiber-array includes providing indicia on the first surface to assist alignment of the first plurality of polarization-maintaining optical fibers during the fusing of the first plurality of polarization-maintaining optical fibers to the first surface.

20. The method of claim 16, wherein the first optical fiber has a first polarization-maintaining axis, wherein the second optical fiber has a second polarization-maintaining axis, and wherein the fusing includes aligning the first plurality of polarization-maintaining fibers such that the first and second polarization-maintaining axes are both parallel to a first plane.

21. The method of claim 16, wherein the fusing of the first plurality of optical fibers to the first surface of the fiber-array plate includes laser welding.

* * * * *